US012039928B2

(12) United States Patent
Yamamoto et al.

(10) Patent No.: US 12,039,928 B2
(45) Date of Patent: Jul. 16, 2024

(54) DISPLAY DEVICE AND METHOD FOR DRIVING SAME

(71) Applicant: Sharp Kabushiki Kaisha, Sakai (JP)

(72) Inventors: Keiichi Yamamoto, Sakai (JP); Ryo Yonebayashi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/909,861

(22) PCT Filed: Apr. 21, 2020

(86) PCT No.: PCT/JP2020/017143
§ 371 (c)(1),
(2) Date: Sep. 7, 2022

(87) PCT Pub. No.: WO2021/214855
PCT Pub. Date: Oct. 28, 2021

(65) Prior Publication Data
US 2024/0203344 A1 Jun. 20, 2024

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2300/0861* (2013.01); *G09G 2310/08* (2013.01); *G09G 2320/0238* (2013.01); *G09G 2320/045* (2013.01); *G09G 2330/021* (2013.01)

(58) Field of Classification Search
CPC ......... G09G 3/3233; G09G 2300/0819; G09G 2300/0842; G09G 2300/0861; G09G 2310/08; G09G 2320/0238; G09G 2320/045; G09G 2330/021
See application file for complete search history.

(56) References Cited

U.S. PATENT DOCUMENTS

2011/0084958 A1* 4/2011 Choi .................... G09G 3/3233 345/76
2019/0340977 A1* 11/2019 Park .................... G09G 3/3275
2019/0362673 A1* 11/2019 Ueda .................... H10K 59/131

FOREIGN PATENT DOCUMENTS

JP 2012-058443 A 3/2012

* cited by examiner

*Primary Examiner* — Abhishek Sarma
(74) *Attorney, Agent, or Firm* — Keating & Bennett, LLP

(57) ABSTRACT

A display device is implemented that can reduce power consumption over a known example while preventing occurrence of black floating. The voltage value of a low-level power supply voltage ELVSS provided to a pixel circuit is set to a higher value in a pause driving period than in a normal driving period. Upon writing a data voltage, an anode initialization period for initializing an anode voltage of an organic EL element is provided. In this regard, an anode initialization period in the pause driving period is made longer than an anode initialization period in the normal driving period. To implement this, for example, a write frequency of a data voltage is made lower in the pause driving period than in the normal driving period.

11 Claims, 19 Drawing Sheets

DISPLAY DEVICE AND METHOD FOR DRIVING SAME

TECHNICAL FIELD

The following disclosure relates to a display device and a method for driving the display device, and particularly to a method for driving a display device that adopts pause driving.

BACKGROUND ART

In recent years, an organic EL display device including pixel circuits each including an organic EL element has been put to practical use. The organic EL element is also called an organic light-emitting diode (OLED), and is a self-emissive display element that emits light at luminance determined based on a current flowing therethrough. As such, since the organic EL element is a self-emissive display element, the organic EL display device can easily achieve slimming down, a reduction in power consumption, an increase in luminance, etc., compared to a liquid crystal display device that requires a backlight, a color filter, and the like.

For the pixel circuit of the organic EL display device, typically, a thin-film transistor (TFT) is adopted as a drive transistor for controlling supply of a current to the organic EL element. However, variations are likely to occur in the characteristics of the thin-film transistor. Specifically, variations are likely to occur in threshold voltage. If variations in threshold voltage occur in the drive transistors provided in a display unit, then variations in luminance occur, degrading display quality. Hence, there are proposed various types of processes (compensation processes) for compensating for variations in threshold voltage.

For schemes for compensation processes, there are known an internal compensation scheme in which a compensation process is performed by providing, in a pixel circuit, a capacitor for holding information on a threshold voltage of a drive transistor; and an external compensation scheme in which a compensation process is performed by, for example, measuring, by a circuit provided external to a pixel circuit, the magnitude of a current flowing through a drive transistor under a predetermined condition, and correcting a video signal based on a result of the measurement.

As a pixel circuit of an organic EL display device that adopts the internal compensation scheme for a compensation process, there is known, for example, a pixel circuit 90 including one organic EL element 91, seven thin-film transistors T91 to T97, and one holding capacitor C9, such as that shown in FIG. 17. To the pixel circuit 90 are provided a high-level power supply voltage ELVDD and a low-level power supply voltage ELVSS as power supply voltages for operation (for driving the organic EL element 91). Note that in the following description, a difference between the high-level power supply voltage ELVDD and the low-level power supply voltage ELVSS is referred to as “EL power supply voltage”. Upon writing a data voltage to the pixel circuit 90, an anode voltage of the organic EL element 91 is initialized. Specifically, an initialization voltage Vini is provided to an anode terminal of the organic EL element 91 through the thin-film transistor T97. Typically, the voltage value of the initialization voltage Vini is equal to the voltage value of the low-level power supply voltage ELVSS. That is, the anode voltage of the organic EL element 91 is initialized based on the low-level power supply voltage ELVSS. Note that in the following description, nodes given reference characters N1, N2, and N3 in FIG. 17 are referred to as “first node”, “second node”, and “third node”, respectively (the same also applies to FIG. 4). The third node N3 is directly connected to the anode terminal of the organic EL element 91.

Now, how to set the voltage value of the low-level power supply voltage ELVSS will be described. FIG. 18 shows a waveform of a light-emission control signal EM(n) provided to the pixel circuit (a pixel circuit in an nth row) 90 and a waveform of a voltage V(N3) at the third node N3 that are obtained upon performing black display. Note that in an example shown in FIG. 18, it is assumed that “60-Hz driving” that uses a driving frequency of 60 Hz is adopted. During operation of the organic EL display device, regarding the pixel circuit 90, a turn-off period 901 during which the organic EL element 91 is in a turn-off state and a light-emission period 902 during which the organic EL element 91 is in a light-emission state are repeated.

During the turn-off period 901, initialization of a voltage at the second node N2 (initialization of a gate voltage of the thin-film transistor T94 serving as a drive transistor), initialization of the voltage V(N3) at the third node N3 (initialization of the anode voltage of the organic EL element 91), and writing of a data voltage to the holding capacitor C9 are performed. As can be grasped from FIG. 18, during the turn-off period 901, the voltage V(N3) at the third node N3 decreases to a voltage equal to the initialization voltage Vini (low-level power supply voltage ELVSS). Note that to be exact, the voltage V(N3) at the third node N3 decreases during a portion of the turn-off period 901 during which the thin-film transistor T97 is in on state to initialize the voltage V(N3) at the third node N3, but for the sake of convenience, in FIG. 18, a waveform is shown such that the voltage V(N3) at the third node N3 decreases throughout the turn-off period 901 (the same also applies to FIGS. 12, 16, 19, 20, and 22).

During the light-emission period 902, the thin-film transistor T96 goes into on state, by which a current based on a target display gray level flows between the first conductive terminal and second conductive terminal of the thin-film transistor T94. Upon performing black display, the current flowing between the first conductive terminal and second conductive terminal of the thin-film transistor T94 is ideally 0, but in practice, leakage current flows between the first conductive terminal and second conductive terminal of the thin-film transistor T94. Therefore, as shown in FIG. 18, the voltage V(N3) at the third node N3 gradually increases during the light-emission period 902. If the voltage V(N3) at the third node N3 becomes higher than a light-emission threshold voltage Ve of the organic EL element 91, then a phenomenon called “black floating” occurs in which despite the fact that black display is supposed to be performed, the organic EL element 91 emits light.

Hence, the voltage value of the low-level power supply voltage ELVSS is set such that the voltage V(N3) at the third node N3 does not become higher than the light-emission threshold voltage Ve of the organic EL element 91 upon performing black display (in other words, such that the voltage V(N3) at the third node N3 is less than or equal to the light-emission threshold voltage Ve of the organic EL element 91 at the end time of the light-emission period 902, as shown in a portion given reference character 93 in FIG. 18).

Although in the example shown in FIG. 18, it is assumed that “60-Hz driving” is adopted, for example, “120-Hz driving” that uses a driving frequency of 120 Hz may be adopted to increase the display quality of a moving image. In this case, the lengths of the turn-off period 901 and the light-emission period 902 are half of those for a case of adopting 60-Hz driving. When the turn-off period 901 is shortened, as shown in a portion given reference character 94 in FIG. 19, the voltage V(N3) at the third node N3 may not decrease to a voltage equal to the initialization voltage Vini (low-level power supply voltage ELVSS) during the turn-off period 901. As a result, as shown in a portion given reference character 95 in FIG. 19, the voltage V(N3) at the third node N3 becomes higher than the light-emission threshold voltage Ve of the organic EL element 91 during a light-emission period 902. Hence, when 120-Hz driving is adopted, the voltage value of the low-level power supply voltage ELVSS is set to a low value compared to a case of adopting 60-Hz driving. For example, it is assumed that when 60-Hz driving is adopted, the low-level power supply voltage ELVSS is set to a voltage corresponding to a line given reference character 97 in FIG. 20. At this time, the low-level power supply voltage ELVSS for a case of adopting 120-Hz driving is set to, for example, a voltage corresponding to a line given reference character 98 in FIG. 20. By thus setting the voltage value of the low-level power supply voltage ELVSS to a low value, as shown in a portion given reference character 96 in FIG. 20, the voltage V(N3) at the third node N3 at the end time of a light-emission period 902 is less than or equal to the light-emission threshold voltage Ve of the organic EL element 91.

Meanwhile, in recent years, there has been an increasing demand for a reduction in power consumption of display devices. For a technique for achieving a reduction in power consumption, there is known a technique called "pause driving" in which a pause period during which the operation of writing data voltages to pixel circuits is stopped is provided. According to the pause driving, data voltages are written only during one frame period among a plurality of consecutive frame periods, and data voltages are not written during other periods. For example, data voltages are written only during one frame period among four consecutive frame periods.

In a display device developed in recent years that adopts such pause driving, switching is performed between normal driving (driving in which data voltages are written to pixel circuits every frame period) and pause driving. For example, when there is no change to display screen throughout a predetermined period, switching from normal driving to pause driving is performed, and when a user has performed some kind of operation or when data is transmitted from an external source, switching from pause driving to normal driving is performed. Thus, for example, as shown in FIG. 21, a normal driving period during which normal driving is performed and a pause driving period during which pause driving is performed appear alternately.

Note that in the following description, a period during which a data voltage is written to each pixel circuit regardless of whether it is a normal driving period or a pause driving period is referred to as "data write period" and a portion of a pause driving period during which a data voltage is not written to each pixel circuit is referred to as "pause period". In addition, when a pause driving period is divided into periods each corresponding to the length of one frame period present during normal driving, a period during which data voltages are written is referred to as "refresh frame" and a period during which data voltages are not written is referred to as "pause frame".

In a case in which the organic EL display device adopts pause driving, if the voltage value of the low-level power supply voltage ELVSS is set to the same value as that in an example shown in FIG. 20, then the voltage V(N3) at the third node N3 may become higher than the light-emission threshold voltage Ve of the organic EL element 91 during a light-emission period 902 as shown in a portion given reference character 99 in FIG. 22. Hence, in a case of adopting pause driving, the voltage value of the low-level power supply voltage ELVSS is set to a low value compared to a case of not adopting pause driving. Note that in FIG. 22, a data write period is given reference character TW, a pause period is given reference character TP, a refresh frame is given reference character RF, and a pause frame is given reference character PF.

In relation to this application, Japanese Laid-Open Patent Publication No. 2012-58443 describes that a power supply voltage applied to a power line differs between two modes (a high-voltage output mode and a low-voltage output mode). In the low-voltage output mode, for example, the frame frequency is one tenth of that in the high-voltage output mode. In the high-voltage output mode, a field-effect transistor is driven in a saturation region, and in the low-voltage output mode, the field-effect transistor is driven in a non-saturation region.

PRIOR ART DOCUMENT

Patent Document

[Patent Document 1] Japanese Laid-Open Patent Publication No. 2012-58443

SUMMARY

Problems to be Solved by the Invention

According to the above-described pause driving, operation of drive circuits such as a gate driver and a source driver stops throughout a pause period. Thus, power consumption arising from operation of the drive circuits is reduced. However, power that is directly related to light emission of the organic EL element 91 (hereinafter, referred to as "EL power" for the sake of convenience.) is not reduced almost at all even if pause driving is adopted. In this regard, in the organic EL display device, the EL power occupies the majority of power consumed by the entire device. Thus, a reduction in EL power may be a solution to an effective reduction in power consumption in the entire device.

Hence, to reduce the EL power, reducing an EL power supply voltage during a pause driving period to a level lower than that in a normal driving period is considered. More specifically, setting the voltage value of the low-level power supply voltage ELVSS used during a pause driving period to a higher value than the voltage value of the low-level power supply voltage ELVSS used during a normal driving period is considered. However, if the voltage value of the low-level power supply voltage ELVSS is increased, then in a pixel in which black display is performed, the voltage V(N3) at the third node N3 does not sufficiently decrease during the turn-off period 901 as described above. As a result, black floating occurs.

An object of the following disclosure is therefore to implement a display device that can reduce power consumption over a known example while preventing occurrence of black floating.

Means for Solving the Problems

A drive method (for a display device) according to some embodiments of the present disclosure is a driving method for a display device including a plurality of data signal lines each transmitting a data voltage; a plurality of scanning signal lines that intersect the plurality of data signal lines; a plurality of light-emission control lines that intersect the plurality of data signal lines; and a plurality of pixel circuits to which a high-level power supply voltage and a low-level power supply voltage are provided, the plurality of pixel circuits each including a display element that is driven by a current, wherein each of the plurality of pixel circuits includes:

the display element having a first terminal and a second terminal to which the low-level power supply voltage is provided;

a drive transistor having a control terminal, a first conductive terminal, and a second conductive terminal and provided in series with the display element;

a capacitor having one terminal connected to the control terminal of the drive transistor, a light-emission control transistor having a control terminal connected to one of the plurality of light-control lines; a first conductive terminal emission connected to the second conductive terminal of the drive transistor; and a second conductive terminal connected to the first terminal of the display element;

a first initialization transistor having a control terminal connected to one of the plurality of scanning signal lines; a first conductive terminal connected to the control terminal of the drive transistor; and a second conductive terminal to which an initialization voltage is provided; and a second initialization transistor having a control terminal connected to one of the plurality of scanning signal lines; a first conductive terminal connected to the first terminal of the display element; and a second conductive terminal to which the initialization voltage is provided, and the driving method includes:

a normal driving step of driving the plurality of data signal lines, the plurality of scanning signal lines, and the plurality of light-emission control lines such that the data voltage is written to the capacitor included in each of the plurality of pixel circuits every frame period;

a pause driving step of driving the plurality of data signal lines, the plurality of scanning signal lines, and the plurality of light-emission control lines such that a data write period during which the data voltage is written to the capacitor included in each of the plurality of pixel circuits and a pause period during which the data voltage is not written to the capacitor included in each of the plurality of pixel circuits appear alternately;

a low-level power supply voltage increasing step of increasing a voltage value of the low-level power supply voltage upon switching from a normal driving period during which the normal driving step is performed to a pause driving period during which the pause driving step is performed; and a low-level power supply voltage reducing step of reducing the voltage value of the low-level power supply voltage upon switching from the pause driving period to the normal driving period, upon writing the data voltage to the capacitor included in each of the plurality of pixel circuits, a first terminal initialization period during which the second initialization transistor is maintained in on state to initialize a voltage at the first terminal of the display element is provided, and the first terminal initialization period in the pause driving period is longer than the first terminal initialization period in the normal driving period.

A display device according to some embodiments of the present disclosure is a display device including a plurality of pixel circuits to which a high-level power supply voltage and a low-level power supply voltage are provided, the plurality of pixel circuits each including a display element that is driven by a current, the display device including:

a plurality of data signal lines each transmitting a data voltage;

a plurality of scanning signal lines that intersect the plurality of data signal lines;

a plurality of light-emission control lines that intersect the plurality of data signal lines;

a pixel driving unit configured to drive the plurality of data signal lines, the plurality of scanning signal lines, and the plurality of light-emission control lines; and a low-level power supply voltage output unit configured to output the low-level power supply voltage, wherein each of the plurality of pixel circuits includes:

the display element having a first terminal and a second terminal to which the low-level power supply voltage is provided;

a drive transistor having a control terminal, a first conductive terminal, and a second conductive terminal and provided in series with the display element;

a capacitor having one terminal connected to the control terminal of the drive transistor, a light-emission control transistor having a control terminal connected to one of the plurality of light-control lines; a first conductive terminal emission connected to the second conductive terminal of the drive transistor; and a second conductive terminal connected to the first terminal of the display element;

a first initialization transistor having a control terminal connected to one of the plurality of scanning signal lines; a first conductive terminal connected to the control terminal of the drive transistor; and a second conductive terminal to which an initialization voltage is provided; and a second initialization transistor having a control terminal connected to one of the plurality of scanning signal lines; a first conductive terminal connected to the first terminal of the display element; and a second conductive terminal to which the initialization voltage is provided, the pixel driving unit drives, during a normal driving period, the plurality of data signal lines, the plurality of scanning signal lines, and the plurality of light-emission control lines such that the data voltage is written to the capacitor included in each of the plurality of pixel circuits every frame period, and drives, during a pause driving period, the plurality of data signal lines, the plurality of scanning signal lines, and the plurality of light-emission control lines such that a data write period during which the data voltage is written to the capacitor included in each of the plurality of pixel circuits and a pause period during which the data voltage is not written to the capacitor included in each of the plurality of pixel circuits appear alternately, during the pause driving period, the low-level power supply voltage output unit outputs the low-level power supply voltage having a higher voltage value than a voltage value in the normal driving period, upon writing the data voltage to the capacitor included in each of the plurality of pixel circuits, a first terminal initialization period during which the second initialization transistor is maintained in on state to initialize a voltage at the first terminal of the display element is provided, and the first terminal initialization period in the pause driving period is longer than the first terminal initialization period in the normal driving period.

Effects of the Invention

According to some embodiments of the present disclosure, during a pause driving period, the voltage value of a low-level power supply voltage is set to a higher value than that in a normal driving period. The low-level power supply voltage is provided to a second terminal of a display element (e.g., a cathode terminal of an organic EL element). In addition, during pause driving, a first terminal initialization period during which an initialization voltage is provided to a first terminal of the display element (e.g., an anode terminal of the organic EL element) is longer than that during normal driving. That is, the first terminal initialization period in the pause driving period is longer than that of a known example. As a result, during the pause driving period, even if the voltage value of the low-level power supply voltage is set to a higher value than that in the normal driving period, in a pixel in which black display is performed, the voltage at the first terminal of the display element sufficiently decreases in the first terminal initialization period. Therefore, in the pixel in which black display is performed, the voltage at the first terminal of the display element is maintained at a light-emission threshold voltage of the display element or less throughout a period during which pause driving is performed. Thus, black floating does not occur. In addition, by setting the voltage value of the low-level power supply voltage used in the pause driving period to a higher value than the voltage value of the low-level power supply voltage used in the normal driving period, EL power to be consumed is reduced. Therefore, a display device is implemented that can reduce power consumption over the known example while preventing occurrence of black floating.

MODE FOR CARRYING OUT THE INVENTION

An embodiment will be described below with reference to the accompanying drawings. Note that in the following description, it is assumed that i and j are integers greater than or equal to 2, n is an integer between 1 and i, inclusive, and m is an integer between 1 and j, inclusive. Note also that the number of writes of a data voltage per second to each pixel circuit during a period (data write period TW) during which data voltages are written to pixel circuits when focusing only on the period is referred to as "write frequency", and the number of writes of a data voltage per second to each pixel circuit during the entire normal driving period or the entire pause driving period is referred to as "update frequency".

<1. Overall Configuration>

Figure 2:
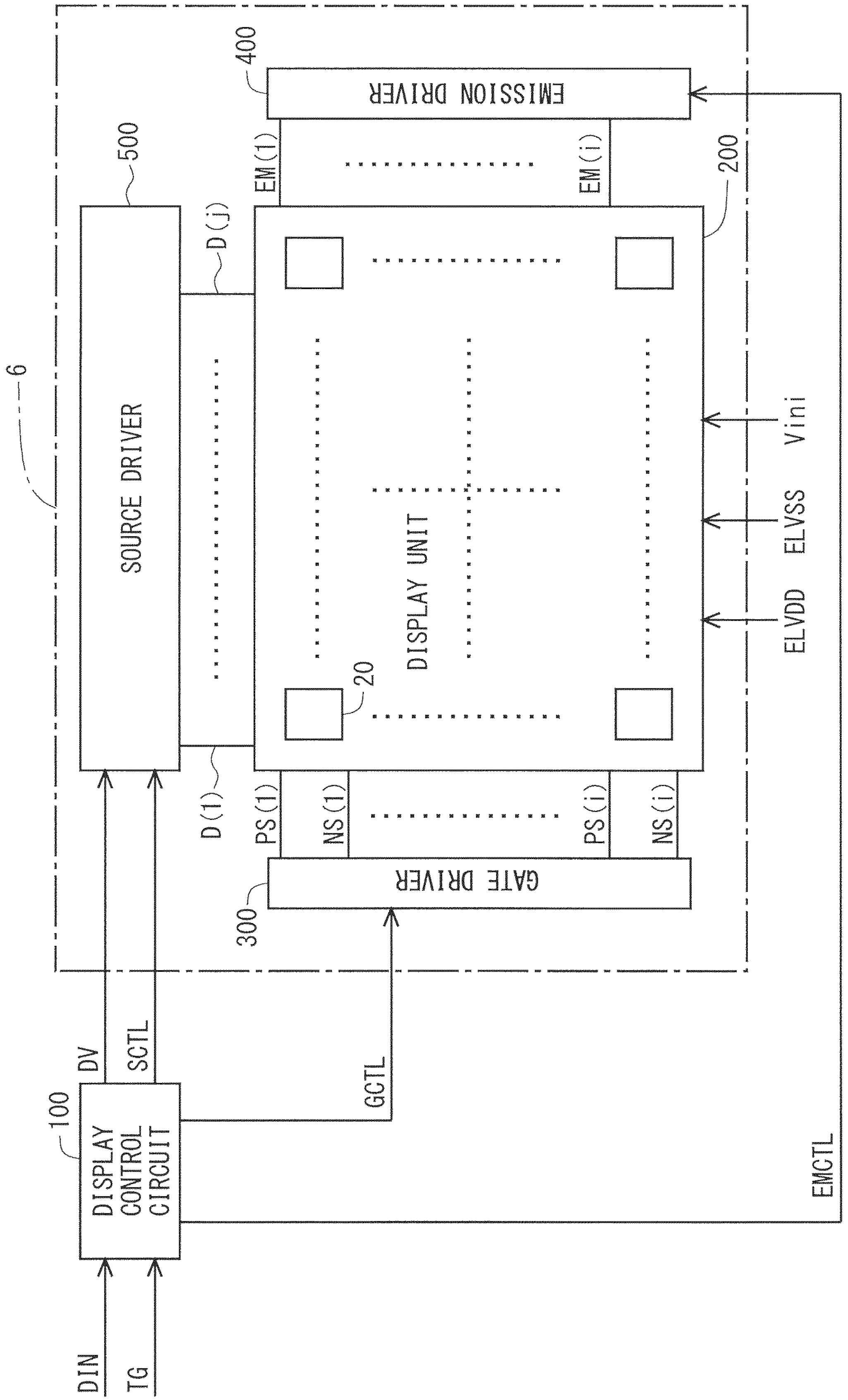
FIG. 2 is a block diagram showing an overall configuration of an organic EL display device according to the embodiment.

FIG. 2 is a block diagram showing an overall configuration of an organic EL display device according to the present embodiment. The organic EL display device is a display device that adopts pause driving. As shown in FIG. 2, the organic EL display device includes a display control circuit 100, a display unit 200, a gate driver (scanning signal line drive circuit) 300, an emission driver (light-emission control line drive circuit) 400, and a source driver (data signal line drive circuit) 500. The gate driver 300, the emission driver 400, and the source driver 500 are included in an organic EL display panel 6 including the display unit 200. Typically, the gate driver 300 and the emission driver 400 are monolithically formed. The source driver 500 may be monolithically formed or may not be monolithically formed. Note that a pixel driving unit is implemented by the gate driver 300, the emission driver 400, and the source driver 500.

As will be described later, in the present embodiment, in each pixel circuit 20 in the display unit 200, N-type transistors and P-type transistors coexist. Signals that control the N-type transistors are hereinafter referred to as "N-type control signals" and signals that control P-type transistors are hereinafter referred to as "P-type control signals".

In the display unit 200 there are disposed i first scanning signal lines NS(1) to NS(i), i second scanning signal lines PS(1) to PS(i), i light-emission control lines EM(1) to EM(i), and j data signal lines D(1) to D(j). Note that depiction of those lines in the display unit 200 of FIG. 2 is omitted. The first scanning signal lines NS(1) to NS(i) are signal lines for transmitting first scanning signals which are the above-described N-type control signals, and the second scanning signal lines PS(1) to PS(i) are signal lines for transmitting second scanning signals which are the above-described P-type control signals. Note that a configuration of the pixel circuit 20 will be described later. The first scanning signal lines NS(1) to NS(i), the second scanning signal lines PS(1) to PS(i), and the light-emission control lines EM(1) to EM(i) are typically parallel to each other. The first scanning signal lines NS(1) to NS(i) and the data signal lines D(1) to D(j) are orthogonal to each other. In the following description, if necessary, first scanning signals that are provided to the respective first scanning signal lines NS(1) to NS(i) are also given reference characters NS(1) to NS(i), second scanning signals that are provided to the respective second scanning signal lines PS(1) to PS(i) are also given reference characters PS(1) to PS(i), and light-emission control signals that are provided to the respective light-emission control lines EM(1) to EM(i) are also given reference characters EM(1) to EM(i).

In addition, in the display unit 200 there are provided i×j pixel circuits 20 at intersecting portions of the i first scanning signal lines NS(1) to NS(i) and the j data signal lines D(1) to D(j). By thus providing the i×j pixel circuits 20, a pixel matrix of i rows×j columns is formed in the display unit 200. Furthermore, in the display unit 200 there are disposed power lines (not shown) that are shared between the pixel circuits 20. More specifically, there are disposed a power line that supplies a low-level power supply voltage ELVSS for driving organic EL elements (hereinafter, referred to as "low-level power line"), a power line that supplies a high-level power supply voltage ELVDD for driving the organic EL elements (hereinafter, referred to as "high-level power line"), and a power line that supplies an initialization voltage Vini (hereinafter, referred to as "initialization power line").

Operation of each component shown in FIG. 2 will be described below. The display control circuit 100 receives an input image signal DIN and a timing signal group (a horizontal synchronizing signal, a vertical synchronizing signal, etc.) TG that are transmitted from an external source, and outputs digital video signals DV, gate control signals GCTL that control operation of the gate driver 300, emission driver control signals EMCTL that control operation of the emission driver 400, and source control signals SCTL that control operation of the source driver 500. The gate control signals GCTL include a gate start pulse signal, a gate clock signal, etc. The emission driver control signals EMCTL include an emission start pulse signal, an emission clock signal, etc. The source control signals SCTL include a source start pulse signal, a source clock signal, a latch strobe signal, etc.

The gate driver 300 is connected to the first scanning signal lines NS(1) to NS(i) and the second scanning signal lines PS(1) to PS(i). The gate driver 300 applies first scanning signals to the first scanning signal lines NS(1) to NS(i) and applies second scanning signals to the second scanning signal lines PS(1) to PS(i), based on the gate control signals GCTL outputted from the display control circuit 100. A high-level potential applied to the first scanning signal lines NS(1) to NS(i) is equal to a high-level potential applied to the second scanning signal lines PS(1) to PS(i), and a low-level potential applied to the first scanning signal lines NS(1) to NS(i) is equal to a low-level potential applied to the second scanning signal lines PS(1) to PS(i).

The emission driver 400 is connected to the light-emission control lines EM(1) to EM(i). The emission driver 400 applies light-emission control signals to the light-emission control lines EM(1) to EM(i), based on the emission driver control signals EMCTL outputted from the display control circuit 100.

The source driver 500 includes a j-bit shift register, a sampling circuit, a latch circuit, j D/A converters, and the like, which are not shown. The shift register has j cascade-connected registers. The shift register sequentially transfers a pulse of the source start pulse signal supplied to a register at an initial stage, from an input terminal to an output terminal, based on the source clock signal. In response to the transfer of the pulse, a sampling pulse is outputted from each stage of the shift register. Based on the sampling pulse, the sampling circuit stores a digital video signal DV. The latch circuit captures and holds digital video signals DV for one row that are stored in the sampling circuit, in accordance with the latch strobe signal. The D/A converters are provided so as to correspond to the respective data signal lines D(1) to D(j). The D/A converters convert the digital video signals DV held in the latch circuit into analog voltages. The converted analog voltages are simultaneously applied, as data signals, to all data signal lines D(1) to D(j).

In the above-described manner, the data signals are applied to the data signal lines D(1) to D(j), the first scanning signals are applied to the first scanning signal lines NS(1) to NS(i), the second scanning signals are applied to the second scanning signal lines PS(1) to PS(i), and the light-emission control signals are applied to the light-emission control lines EM(1) to EM(i), by which an image based on the input image signal DIN is displayed on the display unit 200.

Figure 3:
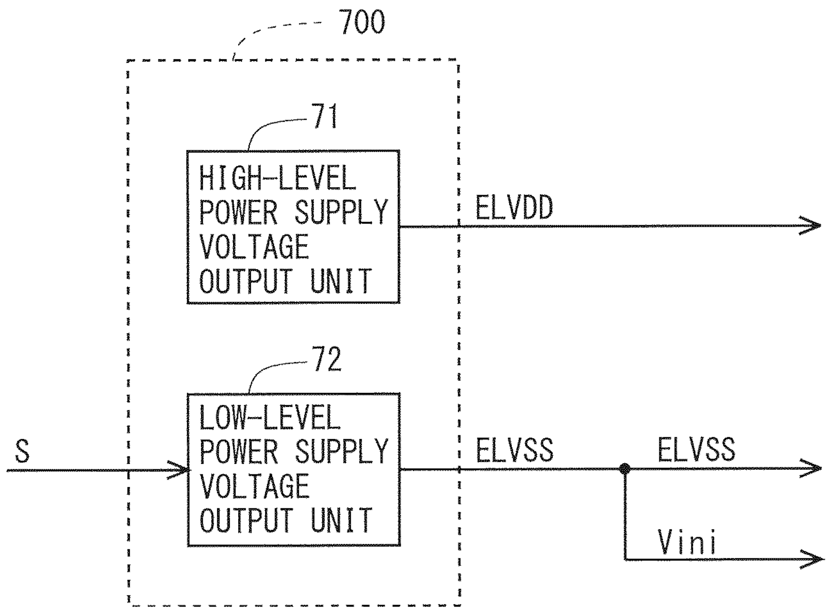
FIG. 3 is a block diagram showing a configuration of a power supply circuit that generates power supply voltages for operation (for driving organic EL elements) in the embodiment.

Meanwhile, the low-level power supply voltage ELVSS, the high-level power supply voltage ELVDD, and the initialization voltage Vini are supplied from a power supply circuit 700 such as that shown in FIG. 3. The power supply circuit 700 includes a high-level power supply voltage output unit 71 and a low-level power supply voltage output unit 72. The high-level power supply voltage output unit 71 outputs the high-level power supply voltage ELVDD. The low-level power supply voltage output unit 72 outputs the low-level power supply voltage ELVSS. Upon the output, the low-level power supply voltage output unit 72 changes the value of the low-level power supply voltage ELVSS, based on a control signal S. Specifically, during a pause driving period, the low-level power supply voltage output unit 72 outputs a low-level power supply voltage ELVSS having a higher voltage value than that in a normal driving period. For example, during the normal driving period, a voltage of −5.5 V is outputted as the low-level power supply voltage ELVSS from the low-level power supply voltage output unit 72, and during the pause driving period, a voltage of −4.4 V is outputted as the low-level power supply voltage ELVSS from the low-level power supply voltage output unit 72.

<2. Pixel Circuits>

<2.1 Configuration of a Pixel Circuit>

Figure 4:
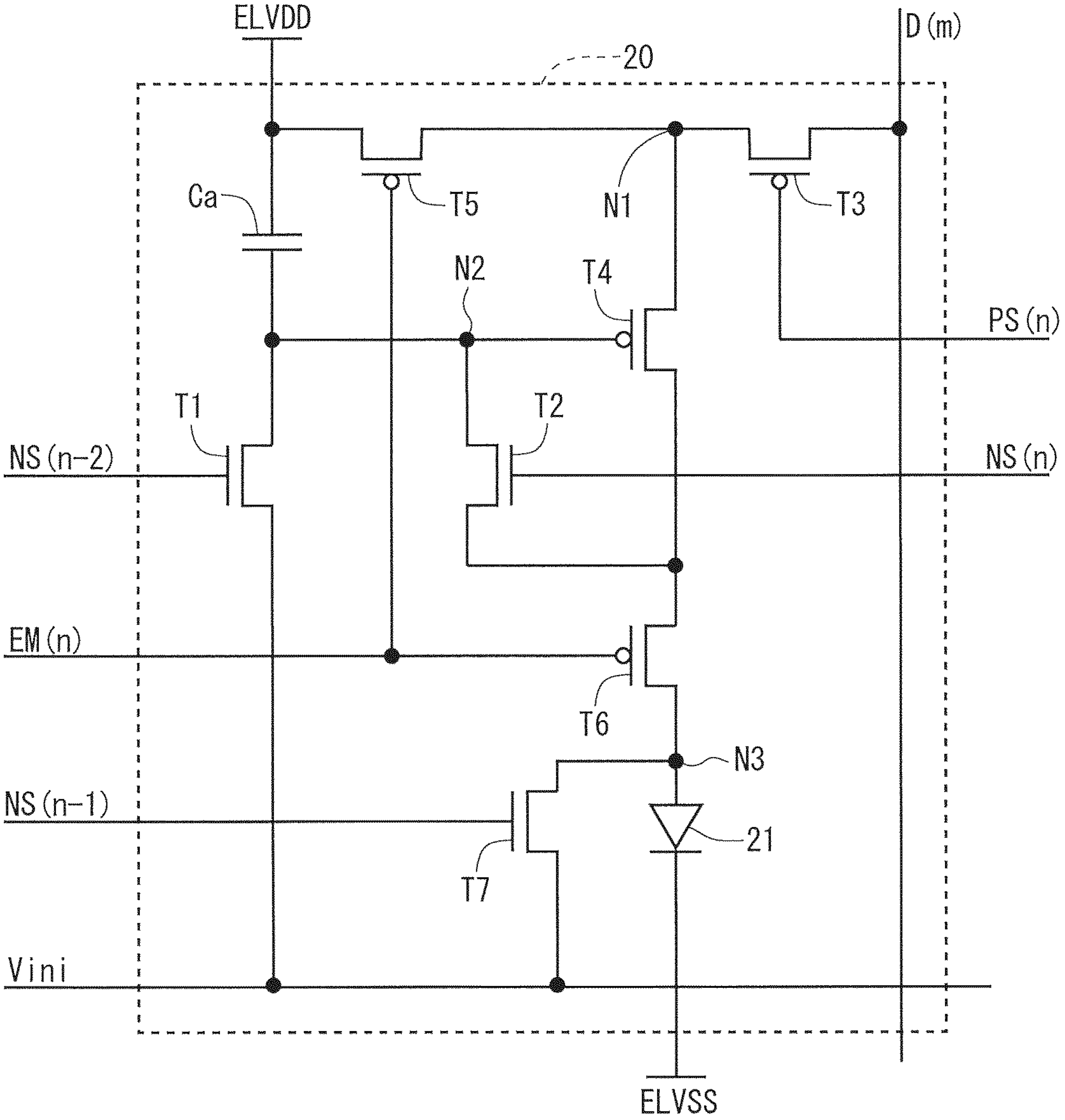
FIG. 4 is a circuit diagram showing an exemplary configuration of a pixel circuit in an nth row and an mth column in the embodiment.

A configuration of a pixel circuit 20 in the display unit 200 will be described. Note that the configuration of the pixel circuit 20 shown here is an example and thus is not limited thereto. FIG. 4 is a circuit diagram showing a configuration of a pixel circuit 20 in an nth row and an mth column. The pixel circuit 20 shown in FIG. 4 includes one organic EL element (organic light-emitting diode) 21 which serves as a display element; seven transistors (typically, thin-film transistors) T1 to T7 (a first initialization transistor T1, a threshold voltage compensation transistor T2, a write control transistor T3, a drive transistor T4, a power supply control transistor T5, a light-emission control transistor T6, and a second initialization transistor T7); and one holding capacitor Ca. The transistors T1, T2, and T7 are N-type transistors. The transistors T3 to T6 are P-type transistors. As such, in the pixel circuit 20, the N-type transistors and the P-type transistors coexist. In terms of a material of a channel layer, the transistors T1, T2, and T7 are, for example, IGZO-TFTs, and the transistors T3 to T6 are, for example, LTPS-TFTs. Note, however, that the configuration is not limited thereto. The holding capacitor Ca is a capacitive element including two electrodes (a first electrode and a second electrode).

The first initialization transistor T1 is connected at its control terminal to a first scanning signal line NS(n−2) in an (n−2)th row, connected at its first conductive terminal to a second node N2, and connected at its second conductive terminal to an initialization power line. The threshold voltage compensation transistor T2 is connected at its control terminal to a first scanning signal line NS(n) in the nth row, connected at its first conductive terminal to a second conductive terminal of the drive transistor T4 and a first conductive terminal of the light-emission control transistor T6, and connected at its second conductive terminal to the second node N2. The write control transistor T3 is connected at its control terminal to a second scanning signal line PS(n) in the nth row, connected at its first conductive terminal to a data signal line D(m) in the mth column, and connected at its second conductive terminal to a first node N1. The drive transistor T4 is connected at its control terminal to the second node N2, connected at its first conductive terminal to the first node N1, and connected at its second conductive terminal to the first conductive terminal of the threshold voltage compensation transistor T2 and the first conductive terminal of the light-emission control transistor T6.

The power supply control transistor T5 is connected at its control terminal to a light-emission control line EM(n) in the nth row, connected at its first conductive terminal to a high-level power line and the first electrode of the holding capacitor Ca, and connected at its second conductive terminal to the first node N1. The light-emission control transistor T6 is connected at its control terminal to the light-emission control line EM(n) in the nth row, connected at its first conductive terminal to the first conductive terminal of the threshold voltage compensation transistor T2 and the second conductive terminal of the drive transistor T4, and connected at its second conductive terminal to a third node N3. The second initialization transistor T7 is connected at its control terminal to a first scanning signal line NS(n−1) in an (n−1)th row, connected at its first conductive terminal to the third node N3, and connected at second conductive terminal to the its initialization power line. The holding capacitor Ca is connected at its first electrode to the high-level power line and the first conductive terminal of the power supply control transistor T5, and connected at its second electrode to the second node N2. The organic EL element 21 is connected at its anode terminal to the third node N3, and connected at its cathode terminal to a low-level power line.

<2.2 Operation of the Pixel Circuit>

Figure 5:
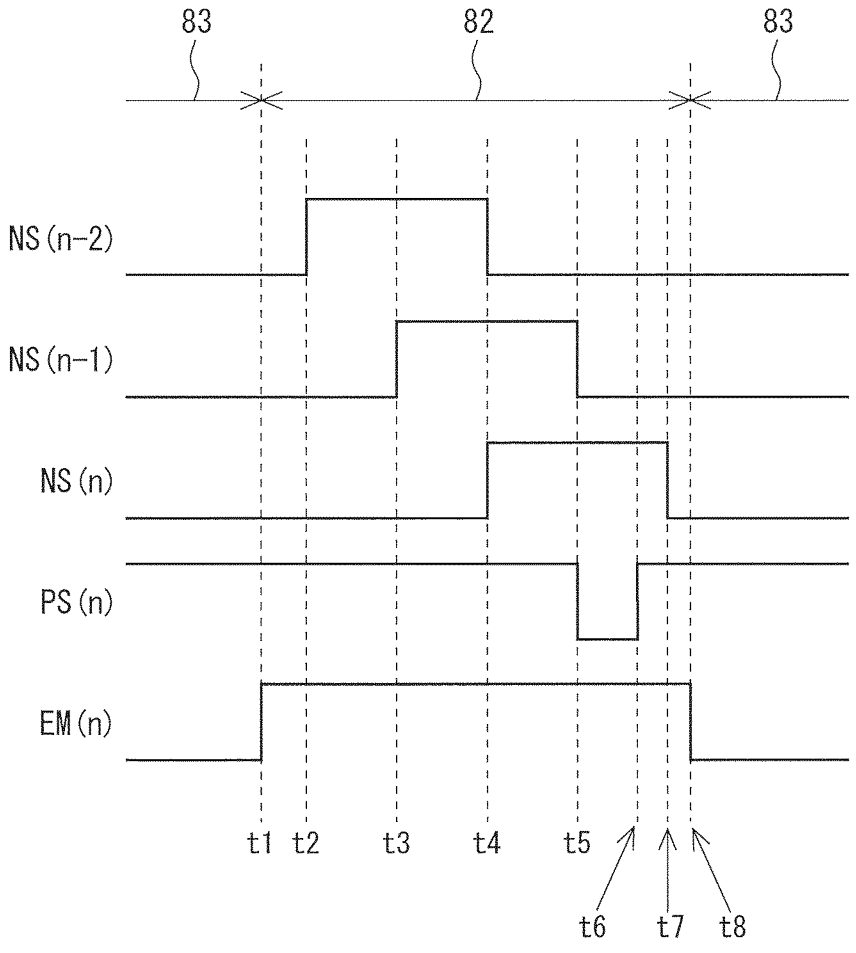
FIG. 5 is a signal waveform diagram for describing operation of the pixel circuit in the embodiment.

Next, operation of the pixel circuit 20 will be described. FIG. 5 is a timing chart for describing operation of a pixel circuit 20 in the nth row (the pixel circuit 20 shown in FIG. 4). Regarding FIG. 5, a period before time t1 and a period after time t8 are light-emission periods 83, and a period from time t1 to t8 is a turn-off period 82.

During the period before time t1, a second scanning signal PS(n) is at high level, and a first scanning signal NS(n−2), a first scanning signal NS(n−1), a first scanning signal NS(n), and a light-emission control signal EM(n) are at low level. At this time, the power supply control transistor T5 and the light-emission control transistor T6 are in on state, and the organic EL element 21 emits light depending on the magnitude of a drive current.

At time t1, the light-emission control signal EM(n) changes from low level to high level. By this, the power supply control transistor T5 and the light-emission control transistor T6 go into off state. As a result, the supply of a current to the organic EL element 21 is interrupted, and the organic EL element 21 goes into turn-off state.

At time t2, the first scanning signal NS(n−2) changes from level to high level. By this, the first initialization transistor T1 goes into on state. As a result, the voltage at the second node N2 (the gate voltage of the drive transistor T4) is initialized. That is, the voltage at the second node N2 becomes equal to the initialization voltage Vini.

At time t3, the first scanning signal NS(n−1) changes from low level to high level. By this, the second initialization transistor T7 goes into on state. As a result, the voltage at the third node N3 (the anode voltage of the organic EL element 21) is initialized.

At time t4, the first scanning signal NS(n−2) changes from high level to low level. By this, the first initialization transistor T1 goes into off state. In addition, at time t4, the first scanning signal NS(n) changes from low level to high level. By this, the threshold voltage compensation transistor T2 goes into on state.

At time t5, the first scanning signal NS(n−1) changes from high level to low level. By this, the second initialization transistor T7 goes into off state. In addition, at time t5, the second signal PS(n) changes from high level to low level. By this, the write control transistor T3 goes into on state. Since the threshold voltage compensation transistor T2 is in on state at time t4, by the write control transistor T3 going into on state at time t5, a data signal D(m) is provided to the second node N2 through the write control transistor T3, the drive transistor T4, and the threshold voltage compensation transistor T2. That is, a data voltage is written to the holding capacitor Ca (the holding capacitor Ca is charged).

At time t6, the second scanning signal PS(n) changes from low level to high level. By this, the write control transistor T3 goes into off state. At time t7, the first scanning signal NS(n) changes from high level to low level. By this, the threshold voltage compensation transistor T2 goes into off state.

At time t8, the light-emission control signal EM(n) changes from high level to low level. By this, the power supply control transistor T5 and the light-emission control transistor T6 go into on state, and a drive current based on the charged voltage in the holding capacitor Ca is supplied to the organic EL element 21. As a result, the organic EL element 21 emits light depending on the magnitude of the drive current. Thereafter, the organic EL element 21 emits light throughout a period until the next time the light-emission control signal EM(n) changes from low level to high level.

Regarding the periods shown in FIG. 5, during a period from time t2 to t4, the voltage at the second node N2 is initialized, during a period from time t3 to t5, the voltage at the third node N3 is initialized, and during a period from time t5 to t6, a data voltage is written. That is, the turn-off period 82 includes a period during which the voltage at the second node N2 is initialized, a period during which the voltage at the third node N3 is initialized, and a period during which the holding capacitor Ca is charged. Note that in the following description, the period during which the voltage at the third node N3 (the anode voltage of the organic EL element 21) is initialized (the period from time t3 to t5) is referred to as "anode initialization period". In the present embodiment, a first terminal initialization period is implemented by the anode initialization period.

<3. Drive Method>

Figure 21:
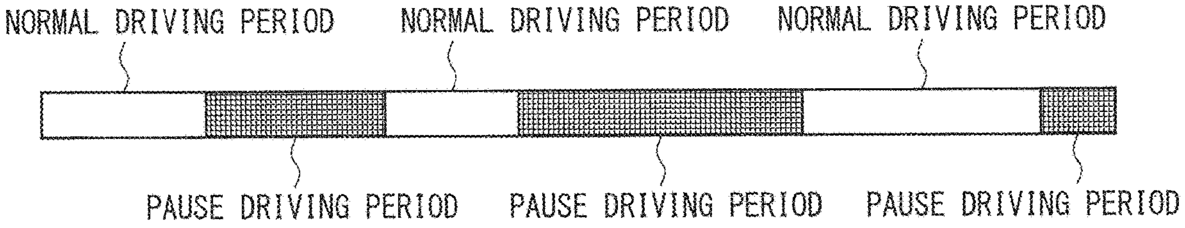
FIG. 21 is a diagram for describing pause driving, regarding the known example.
Figure 22:
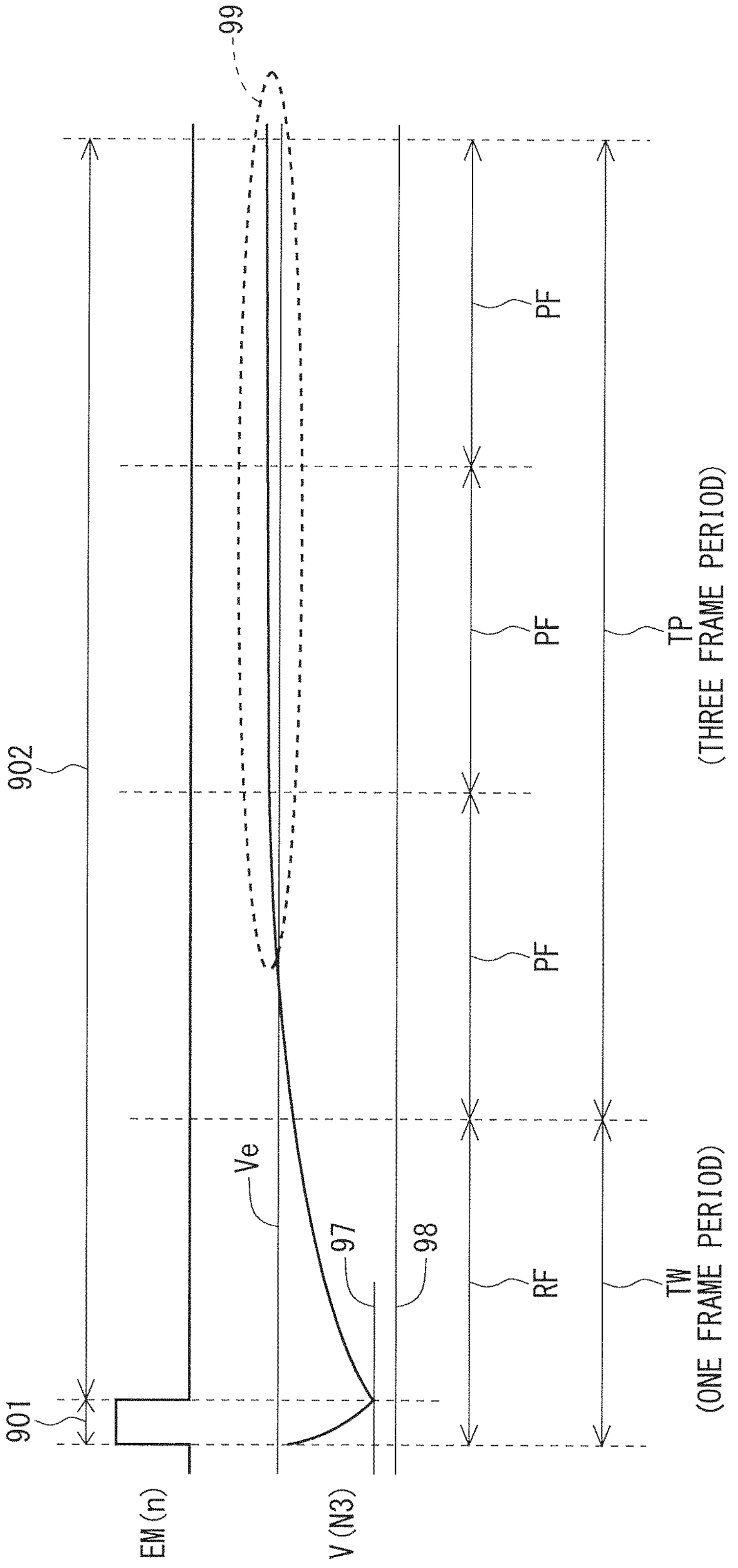
FIG. 22 is a signal waveform diagram for describing how to set the voltage value of the low-level power supply voltage when pause driving is adopted, regarding the known example.

A drive method of the present embodiment will be described below. As described above, the organic EL display device according to the present embodiment is a display device that adopts pause driving. Thus, during operation of the organic EL display device, as shown in FIG. 21, a normal driving period during which normal driving is performed and a pause driving period during which pause driving is performed appear alternately.

<3.1 Normal Driving Period>

Figure 6:
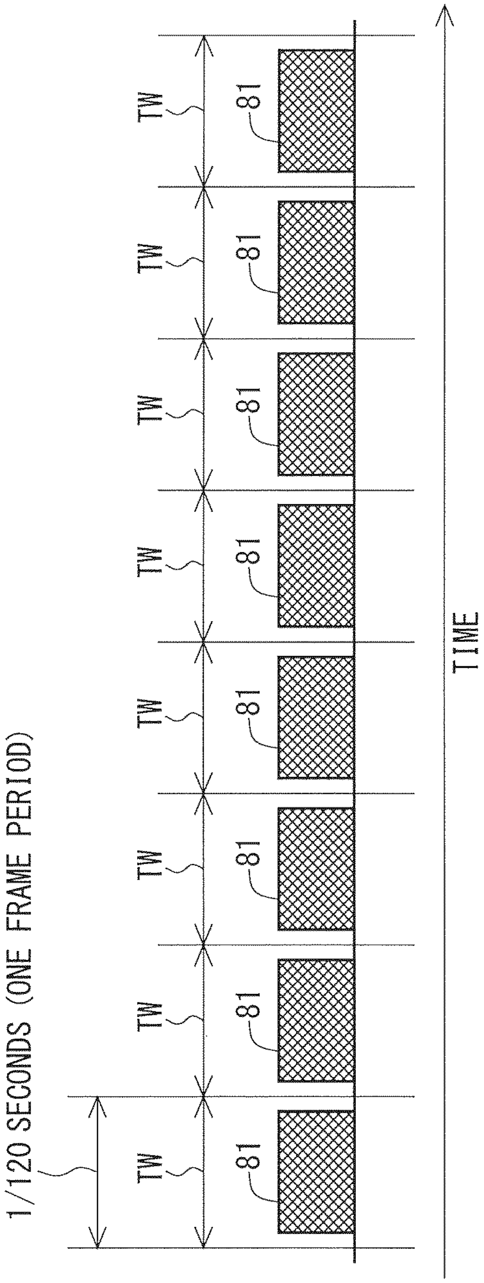
FIG. 6 is a diagram for describing normal driving in the embodiment.

As shown in FIG. 6, during a normal driving period, the data write period TW for sequentially writing data voltages to the pixel circuits 20 from the first row to the ith row appears every frame period. Note that in FIG. 6, a period during which data voltages are actually written to holding capacitors Ca included in pixel circuits 20 in each row is represented by cross-hatching given reference character 81 (the same also applies to FIGS. 1 and 7 to 9). In the present embodiment, one frame period is 1/120 seconds. That is, the data write period TW appears every 1/120 seconds. In other words, during the normal driving period, both the write frequency and the update frequency are 120 Hz.

<3.2 Pause Driving Period>

Figure 7:
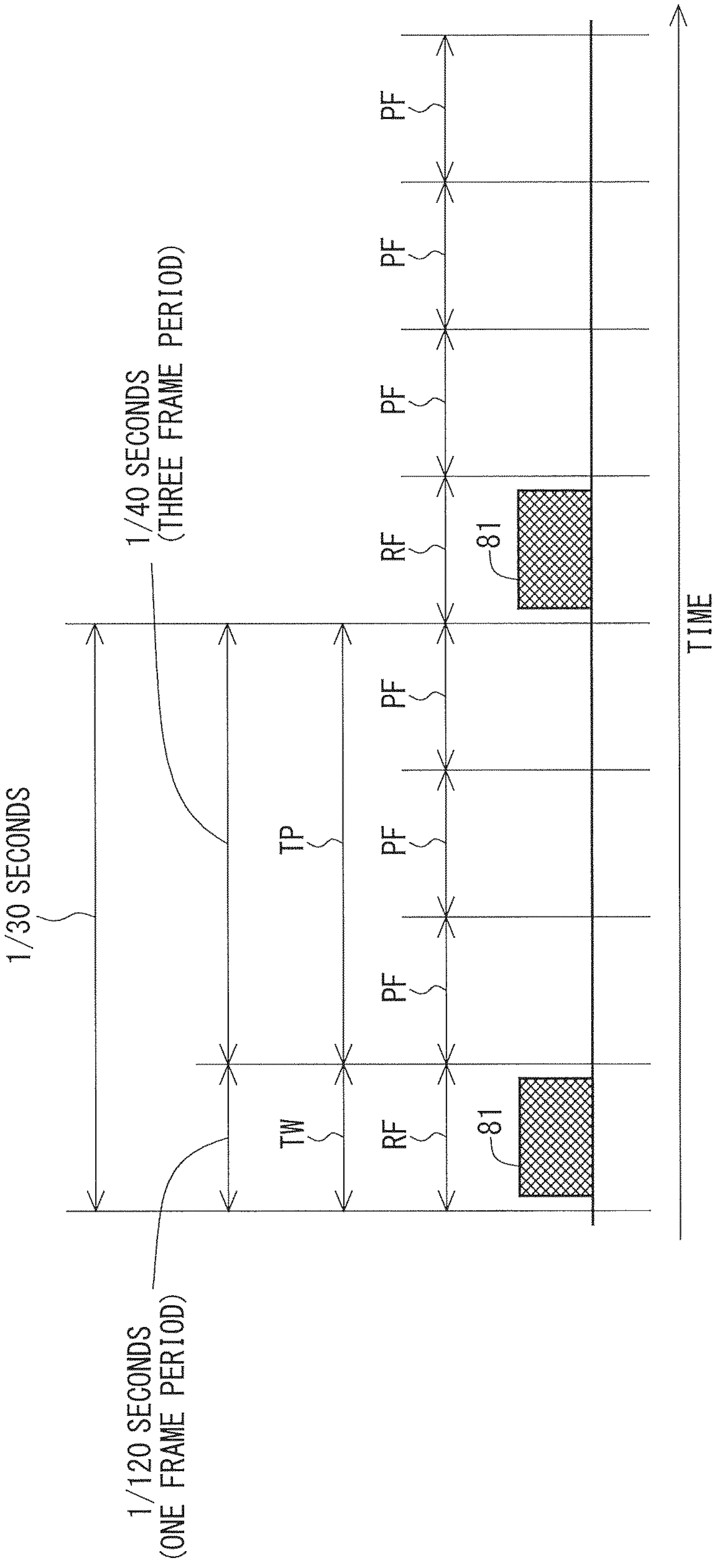
FIG. 7 is a diagram for describing known pause driving.

In a known organic EL display device that adopts pause driving, during a pause driving period, for example, as shown in FIG. 7, a data write period TW with a length corresponding to one frame period (1/120 seconds) present during normal driving and a pause period TP with a length corresponding to three frame periods (1/40 seconds) present during normal driving are repeated alternately. In other words, one refresh frame RF and three pause frames PF are repeated. In an example shown in FIG. 7, the write frequency in the data write period TW is 120 Hz. By providing a pause period TP with a length corresponding to three frame periods after such a data write period TW, the update frequency is 30 Hz.

Figure 8:
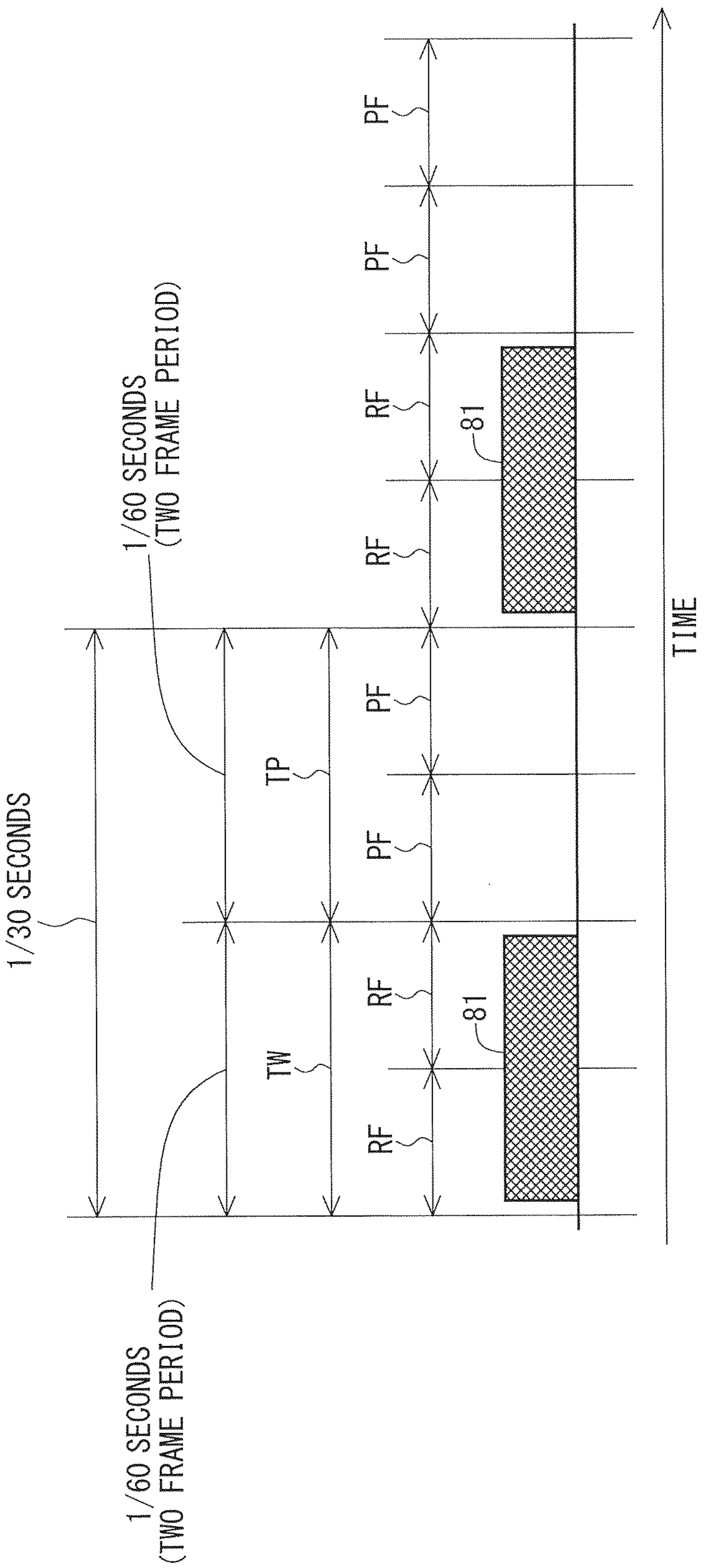
FIG. 8 is a diagram for describing pause driving in the embodiment.

On the other hand, in the present embodiment, during a pause driving period, as shown in FIG. 8, a data write period TW with a length corresponding to two frame periods (1/60 seconds) present during normal driving and a pause period TP with a length corresponding to two frame periods (1/60 seconds) present during normal driving are repeated alternately. Note that during two refresh frames RF included in one data write period TW, one rewrite of the entire screen is performed. That is, unlike the example shown in FIG. 7, the write frequency in the data write period TW is 60 Hz. As described above, during a normal driving period, the write frequency is 120 Hz. Thus, in the present embodiment, during the data write period TW, data voltages are written to the pixel circuits 20 at a lower speed in the pause driving period than in the normal driving period. In addition, in the pause driving period, the length of driving time (each period shown in FIG. 5) of the pixel circuit 20 can be increased to twice that in the normal driving period.

Note that although here, as an example, a case is described in which a data write period TW with a length corresponding to two frame periods present during normal driving and a pause period TP with a length corresponding to two frame periods present during normal driving are repeated alternately (see FIG. 8), the length of the data write period TW and the length of the pause period TP are not limited thereto.

<3.3 Switching Between Normal Driving and Pause Driving>

Figure 9:
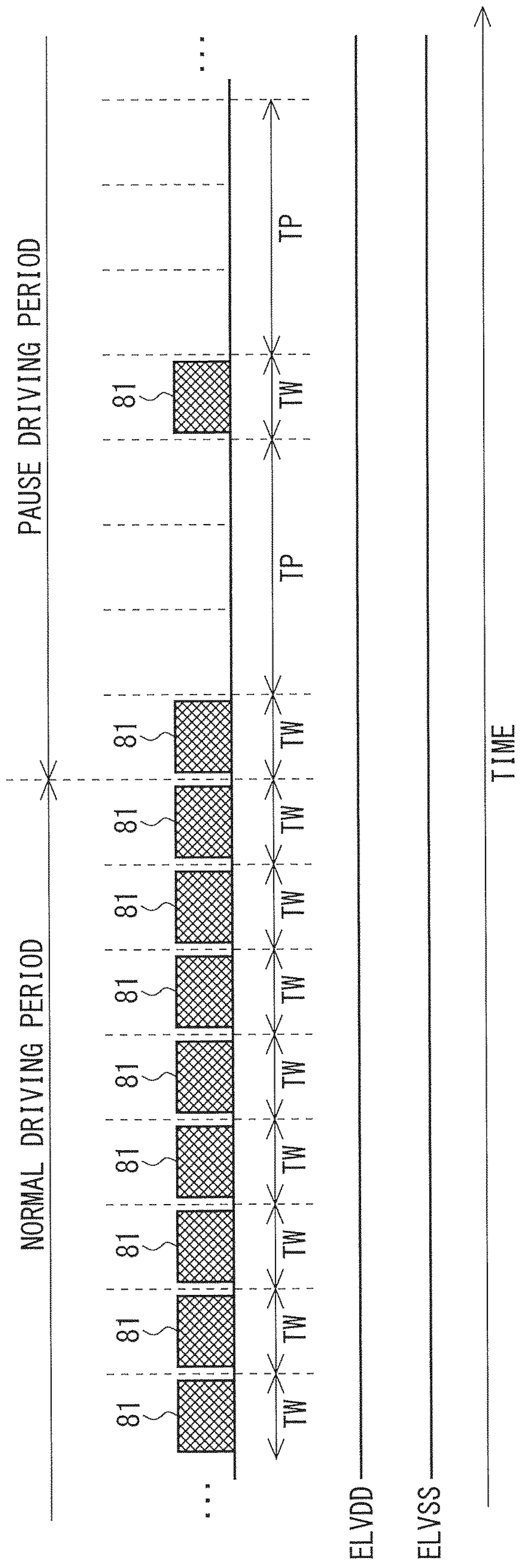
FIG. 9 is a diagram for describing operation performed upon switching between normal driving and pause driving in a known organic EL display device.

Next, operation performed upon switching between normal driving and pause driving will be described. In a known organic EL display device that adopts pause driving, as shown in FIG. 9, even if switching from a normal driving period to a pause driving period is performed, there is no change in the voltage value of the high-level power supply voltage ELVDD and the voltage value of the low-level power supply voltage ELVSS. The same is true for when switching from the pause driving period to the normal driving period is performed. As above, in the known organic EL display device that adopts pause driving, the magnitude of EL power supply voltage is the same between in the pause driving period and in the normal driving period.

Figure 1:
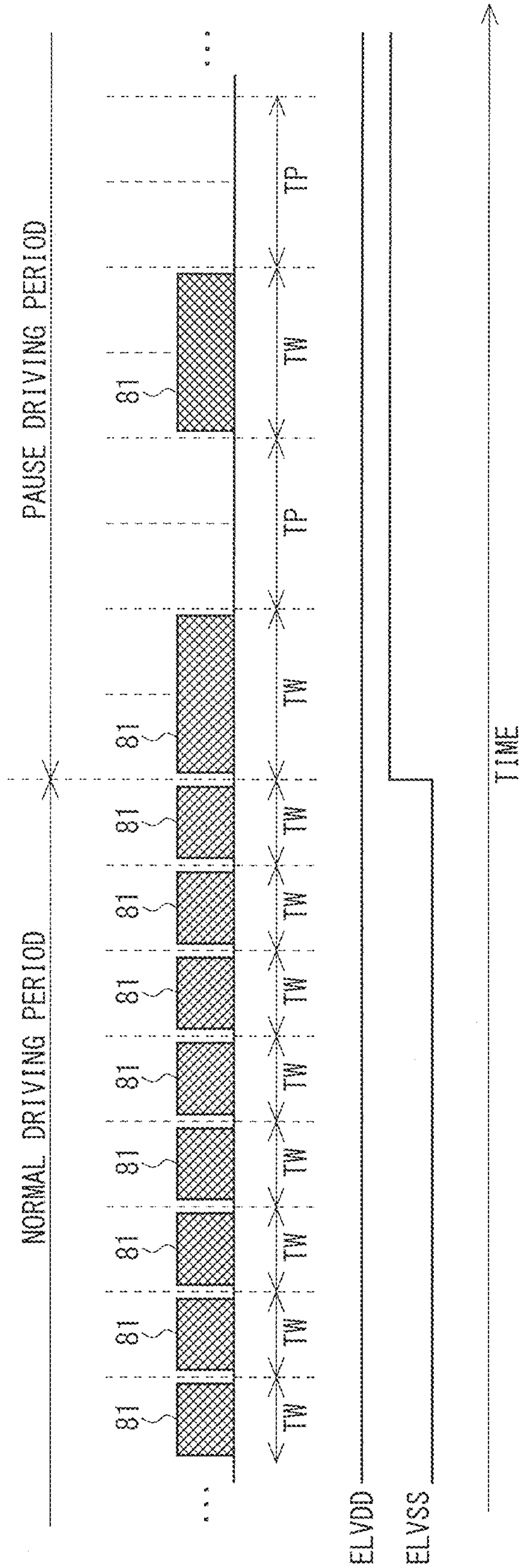
FIG. 1 is a diagram for describing operation performed upon switching between normal driving and pause driving in one embodiment.
Figure 10:
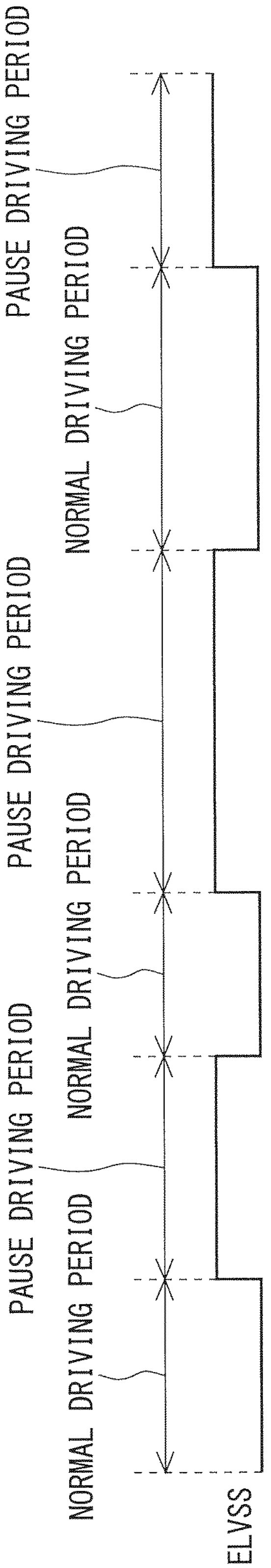
FIG. 10 is a diagram for describing changes in the voltage value of a low-level power supply voltage associated with switching between normal driving and pause driving in the embodiment.

On the other hand, in the present embodiment, as described above, during a pause driving period, the low-level power supply voltage output unit 72 outputs a low-level power supply voltage ELVSS having a higher voltage value than that in a normal driving period. Thus, upon switching from the normal driving period to the pause driving period, the voltage value of the low-level power supply voltage ELVSS increases as shown in FIG. 1. On the other hand, upon switching from the pause driving period to the normal driving period, the voltage value of the low-level power supply voltage ELVSS decreases. Therefore, as shown in FIG. 10, throughout a period during which the organic EL display device operates, the voltage value of the low-level power supply voltage ELVSS is a relatively low value during the normal driving period, and the voltage value of the low-level power supply voltage ELVSS is a relatively high value during the pause driving period. By this, during the pause driving period, the magnitude of the EL power supply voltage is small compared to that during the normal driving period. Since the EL power is proportional to the magnitude of the EL power supply voltage, by a reduction in the EL power supply voltage used during pause driving, the EL power decreases. In addition, the write frequency in the normal driving period is 120 Hz, whereas the write frequency in the pause driving period is 60 Hz. As such, during the pause driving period, the write frequency is low compared to that in the normal driving period. Accordingly, an anode initialization period in the pause driving period is longer than an anode initialization period in the normal driving period.

Figure 11:
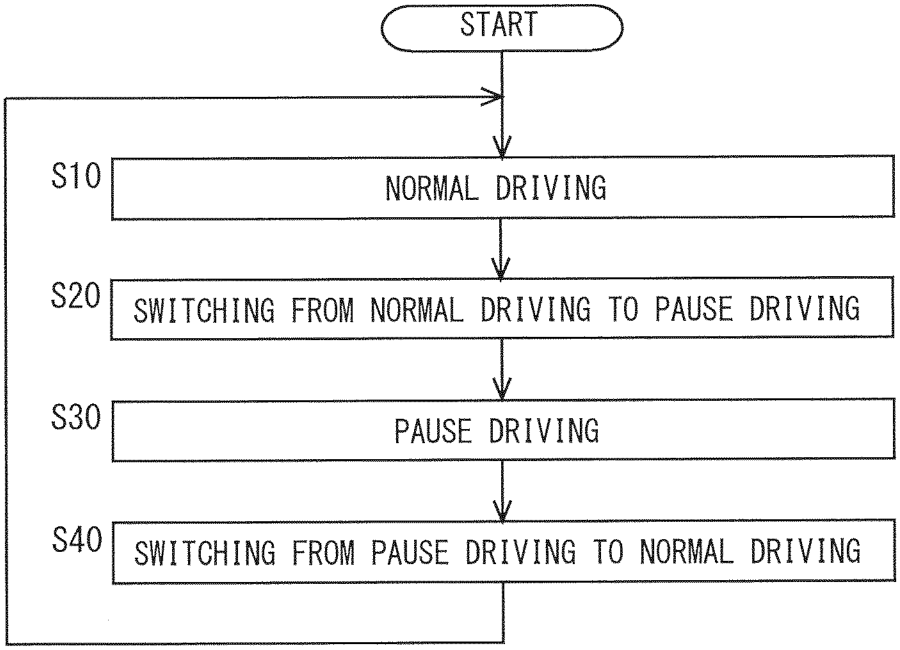
FIG. 11 is a flowchart for describing a drive method of the embodiment.

From the above, in the present embodiment, as shown in FIG. 11, it is conceivable that a series of operations are repeated that include step S10 at which normal driving is performed, step S20 at which switching from normal driving to pause driving is performed, step S30 at which pause driving is performed, and step S40 at which switching from pause driving to normal driving is performed. In this regard, at step S10, the data signal lines D(1) to D(j), the first scanning signal lines NS(1) to NS(i), the second scanning signal lines PS(1) to PS(i), and the light-emission control lines EM(1) to EM(i) are driven such that data voltages are written to the holding capacitors Ca included in the respective pixel circuits 20 every frame period; at step S20, the voltage value of the low-level power supply voltage ELVSS is increased; at step S30, the data signal lines D(1) to D(j), the first scanning signal lines NS(1) to NS(i), the second scanning signal lines PS(1) to PS(i), and the light-emission control lines EM(1) to EM(i) are driven such that a data write period TW during which data voltages are written to the holding capacitors Ca included in the respective pixel circuits 20 and a pause period TP during which data voltages are not written to the holding capacitors Ca included in the respective pixel circuits 20 appear alternately; and at step S40, the voltage value of the low-level power supply voltage ELVSS is reduced.

Note that a normal driving step is implemented by the above-described step S10, a low-level power supply voltage increasing step is implemented by the above-described step S20, a pause driving step is implemented by the above-described step S30, and a low-level power supply voltage reducing step is implemented by the above-described step S40.

<4. Specific Example of a Reduction in EL Power>

A specific example of a reduction in EL power will be described.

In a normal driving period, the high-level power supply voltage ELVDD, the low-level power supply voltage ELVSS, and the initialization voltage Vini are set as follows:

ELVDD=4.6 V

ELVSS=−5.5 V

Vini=−5.5 V

In a pause driving period, the high-level power supply voltage ELVDD, the low-level power supply voltage ELVSS, and the initialization voltage Vini are set as follows:

ELVDD=4.6 V

ELVSS=−4.4 V

Vini=−4.4 V

The EL power P consumed during a certain period is proportional to the EL power supply voltage (a difference between the high-level power supply voltage ELVDD and the low-level power supply voltage ELVSS). More specifically, when the drive current flowing during a certain period is I, the EL power P consumed during the certain period is represented by the following equation (1):

$$P=(\mathrm{ELVDD}-\mathrm{ELVSS})\times I \tag{1}$$

Based on the above equation (1), the EL power during the certain period in the normal driving period is "10.1×I", and the EL power during the certain period in the pause driving period is "9.0×I". Thus, as can be grasped from the following equation (2), by adopting the drive method of the present embodiment, the EL power during the pause driving period is reduced by about 11% compared to that of the known example.

$$((10.1-9.0)/10.1)\times 100=10.89 \tag{2}$$

<5. Effects>

Figure 12:
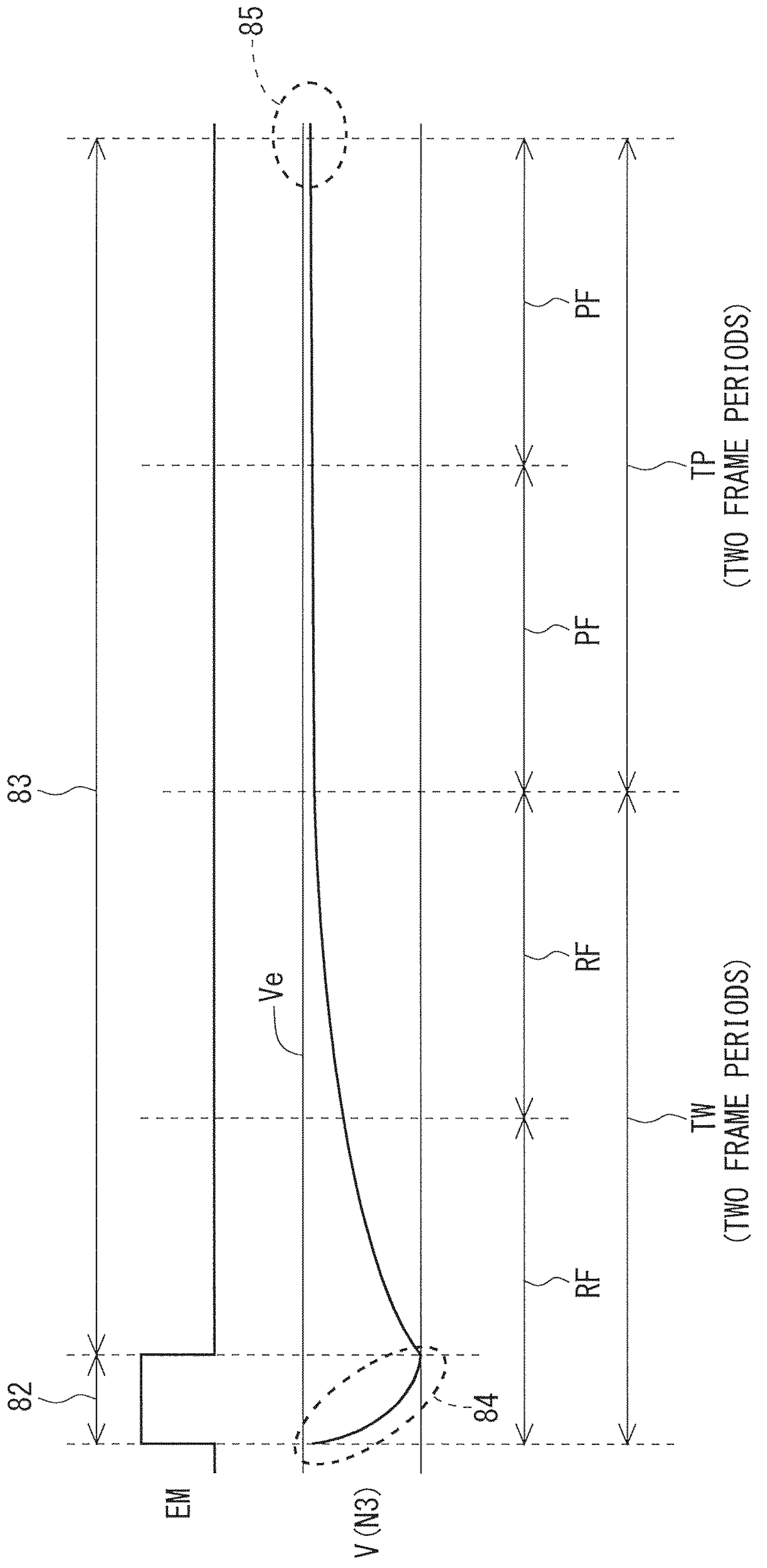
FIG. 12 is a signal waveform diagram for describing effects provided in the embodiment.

According to the present embodiment, during the pause driving period, the voltage value of the low-level power supply voltage ELVSS is set to a higher value than that in the normal driving period. In addition, during the normal driving period, the write frequency is 120 Hz, whereas during the pause driving period, the write frequency is 60 Hz. Thus, the length of a data write period TW during pause driving is a length corresponding to two frame periods present during normal driving. Therefore, a turn-off period during pause driving is longer than a turn-off period during normal driving. That is, during pause driving, an anode initialization period is longer than that during normal driving. In other words, the anode initialization period in the pause driving period is longer than that of the known example. As a result, during the pause driving period, even if the voltage value of the low-level power supply voltage ELVSS is set to a higher value than that in the normal driving period, in a pixel in which black display is performed, as shown in a portion given reference character 84 in FIG. 12, the voltage V(N3) at the third node N3 sufficiently decreases during a turn-off period 82. Therefore, as shown in a portion given reference character 85 in FIG. 12, even at the end time of a light-emission period 83, the voltage V(N3) at the third node N3 is maintained at the light-emission threshold voltage Ve of the organic EL element 21 or less. Thus, black floating does not occur.

Figure 13:
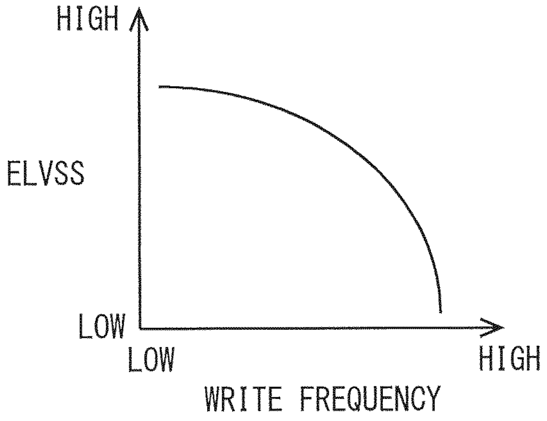
FIG. 13 is a graph showing a relationship between a write frequency and the voltage value (an upper limit value that can be set) of the low-level power supply voltage in the embodiment.
Figure 14:
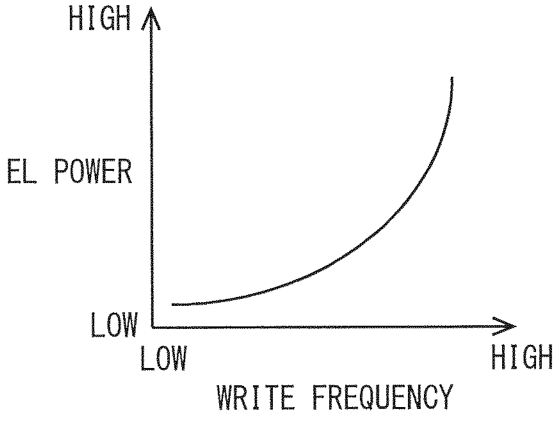
FIG. 14 is a graph showing a relationship between the write frequency and EL power in the embodiment.

Meanwhile, the anode initialization period increases as the write frequency decreases, and thus, as shown in FIG. 13, the voltage value of the low-level power supply voltage ELVSS can be increased as the write frequency decreases. In addition, the EL power decreases as the voltage value of the low-level power supply voltage ELVSS increases. Thus, as shown in FIG. 14, the EL power decreases as the write frequency decreases. In the present embodiment, the write frequency during the pause driving period is lower than that of the known example, and thus, the EL power is reduced compared to the known example.

Figure 15:
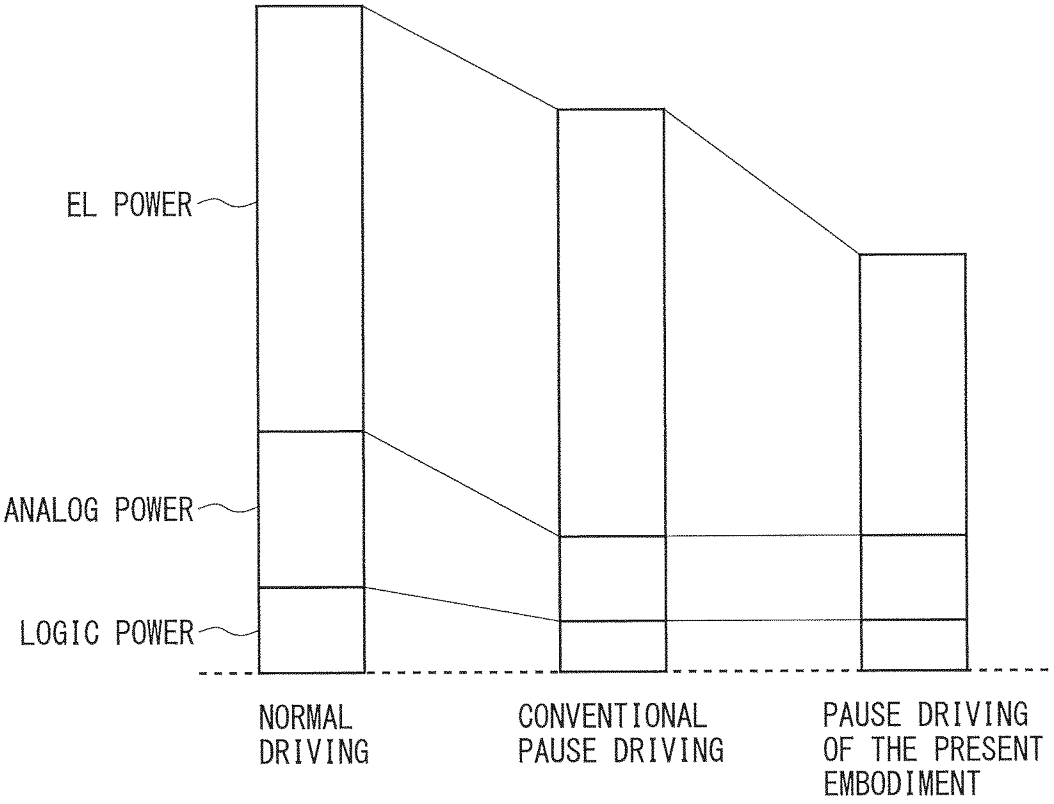
FIG. 15 is a diagram for describing an effect of a reduction in power consumption in the embodiment.

FIG. 15 is a diagram showing the comparison of power consumption between normal driving, known pause driving, and pause driving of the present embodiment. According to the known pause driving, analog power and logic power are reduced compared to the normal driving. However, EL power is not reduced almost at all. In contrast, according to the pause driving of the present embodiment, in addition to analog power and logic power, EL power is also reduced compared to the normal driving. As such, according to the present embodiment, it becomes possible to reduce EL power that occupies the majority of power consumed by the entire device.

From the above, according to the present embodiment, an organic EL display device is implemented that can reduce power consumption over the known example while preventing occurrence of black floating.

<6. Variants>

Variants of the above-described embodiment will be described below.

<6.1 First Variant>

According to the above-described embodiment, a data write period TW is longer during pause driving than during normal driving. In a case in which a pixel circuit 20 having the configuration shown in FIG. 4 is adopted (that is, in a case in which the drive transistor T4 is a P-type transistor), a data voltage corresponding to black is a relatively high voltage, and a data voltage corresponding to white is a relatively low voltage. If a period during which data voltages are written is long, then it becomes possible to set the data voltage corresponding to black to a lower voltage than its original data voltage. When the data voltage corresponding to black is set to a lower voltage than its original data voltage, a high-level voltage (a high-level voltage for a first scanning signal) applied to the control terminal of the threshold voltage compensation transistor T2 upon writing a data voltage can be set to a lower voltage than its original voltage.

Hence, in the present variant, during a pause driving period, in addition to setting the voltage value of the low-level power supply voltage ELVSS to a higher value than that in a normal driving period, the voltage value of a high-level power supply voltage DVDD for drivers (the gate driver 300 and the emission driver 400) is set to a lower value than that in the normal driving period. By this, during the pause driving period, the amount of power (analog power) consumption arising from operation of the drivers is reduced over the known example, and an effect of a further reduction in power consumption over the above-described embodiment can be obtained.

A specific example of a reduction in analog power by the present variant will be described below.

In a normal driving period, the high-level power supply voltage DVDD for the drivers and a low-level power supply voltage DVSS for the drivers are set as follows:

DVDD=6.5 V

DVSS=−8.0 V

In a pause driving period, the high-level power supply voltage DVDD for the drivers and the low-level power supply voltage DVSS for the drivers are set as follows:

DVDD=6.0 V

DVSS=−8.0 V

Analog power consumed by the drivers is proportional to the square of a difference between the high-level power supply voltage DVDD and the low-level power supply voltage DVSS. When K is the proportionality coefficient, analog power consumed during a certain period in the normal driving period is "$(6.5+8.0)^2\times K$", and analog power consumed during the certain period in the pause driving period is "$(6.0+8.0)^2\times K$". Thus, as can be grasped from the following equation (3), by adopting the technique of the present variant, analog power consumed during the pause driving period is reduced by about 7% compared to the known example.

$$((14.5^2-14.0^2)/14.5^2)\times 100=6.78 \quad (3)$$

Note that the high-level power supply voltage DVDD for the drivers corresponds to a first power supply voltage, and the low-level power supply voltage DVSS for the drivers corresponds to a second power supply voltage.

<6.2 Second Variant>

In the above-described embodiment, in order to prevent occurrence of black floating, during a pause driving period, the write frequency is set to a lower value than that in a normal driving period. However, the same write frequency can be set for the normal driving period and the pause driving period, which will be described below.

Figure 16:
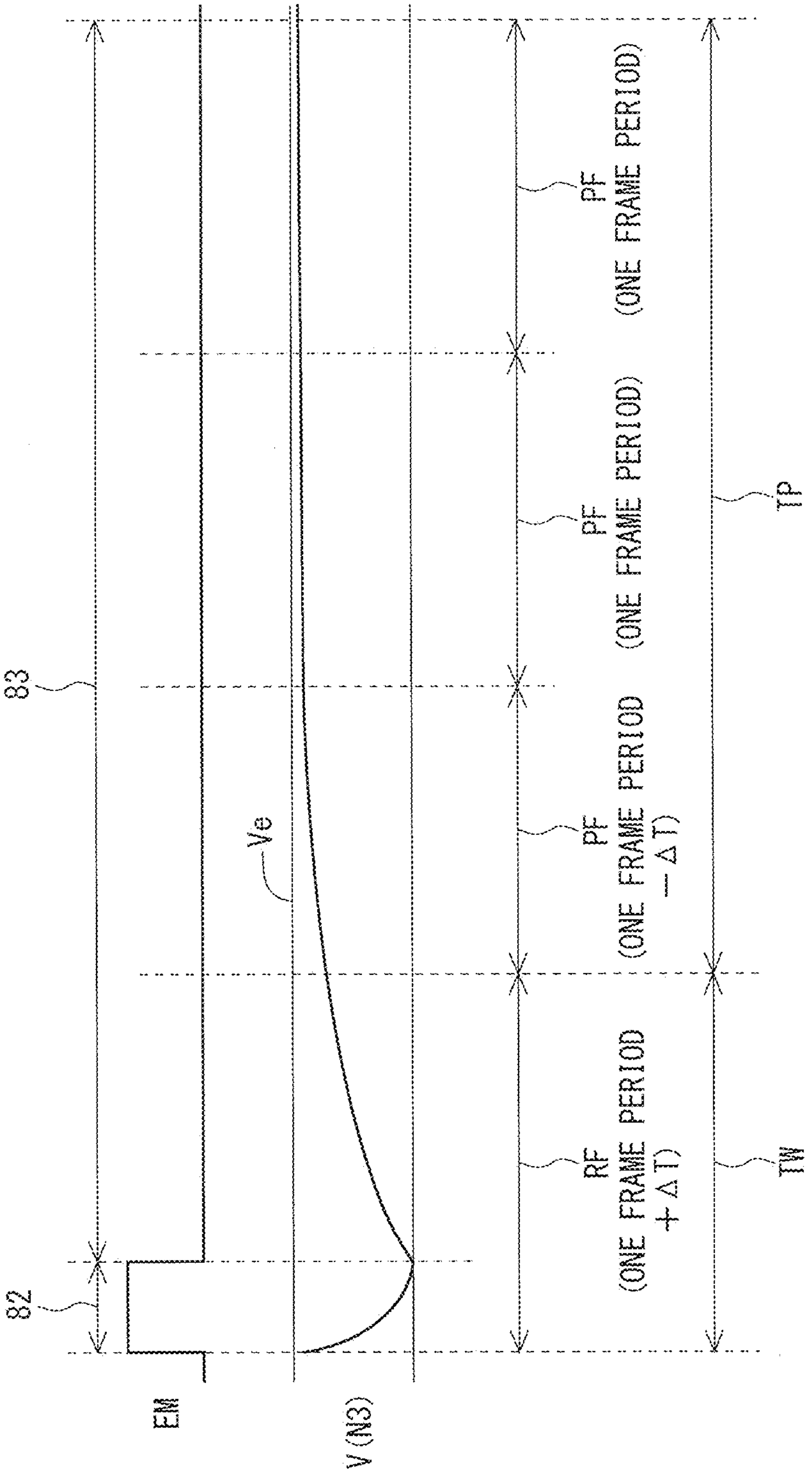
FIG. 16 is a signal waveform diagram for describing a drive method of a second variant of the embodiment.
Figure 17:
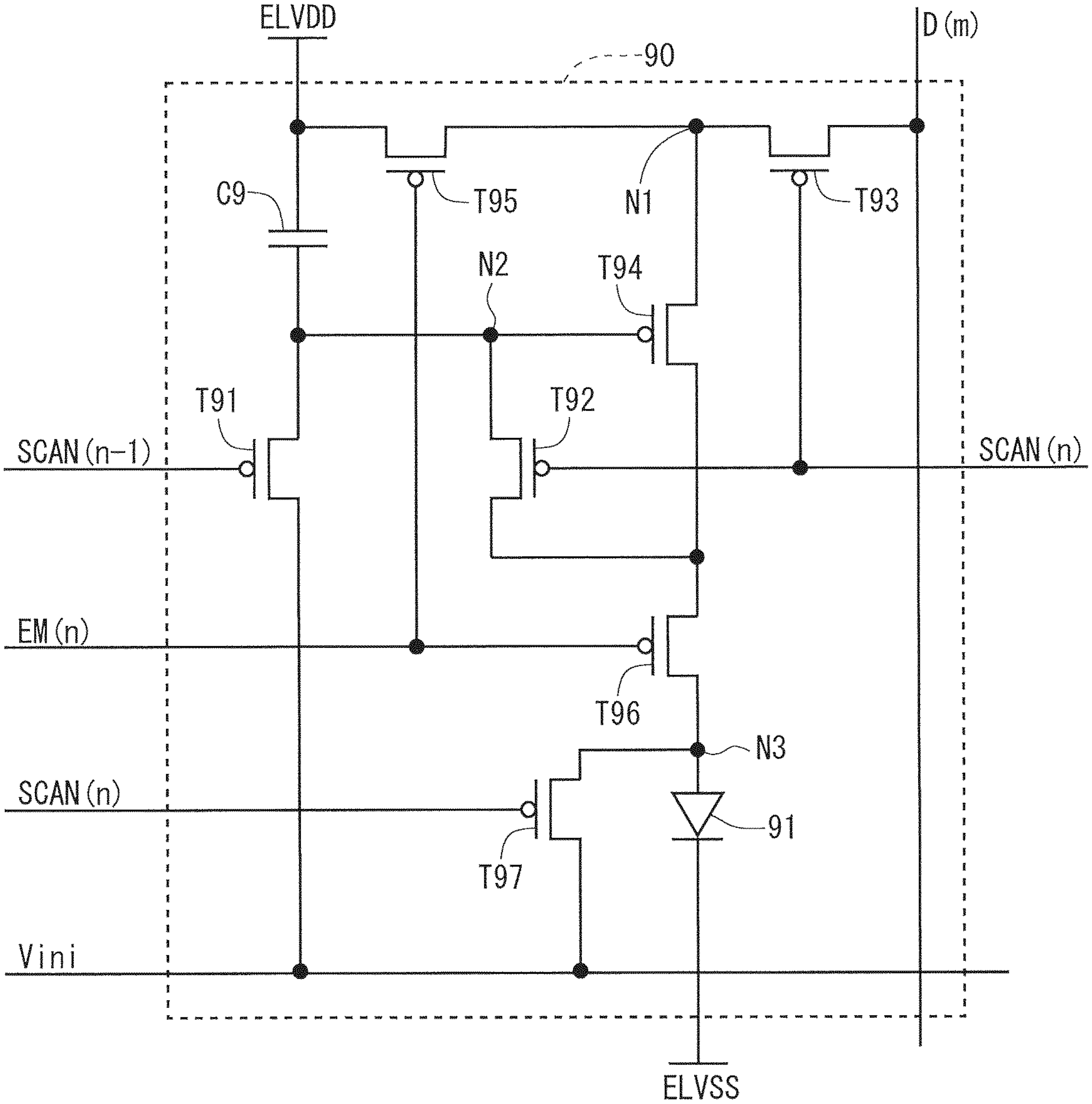
FIG. 17 is a circuit diagram showing an exemplary configuration of a pixel circuit in an nth row and an mth column of a known example.
Figure 18:
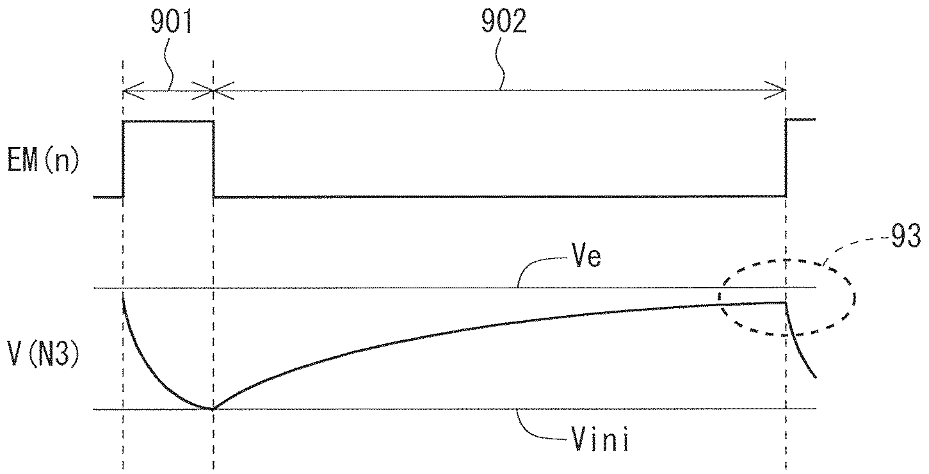
FIG. 18 is a signal waveform diagram for describing how to set the voltage value of the low-level power supply voltage when 60-Hz driving is adopted, regarding the known example.
Figure 19:
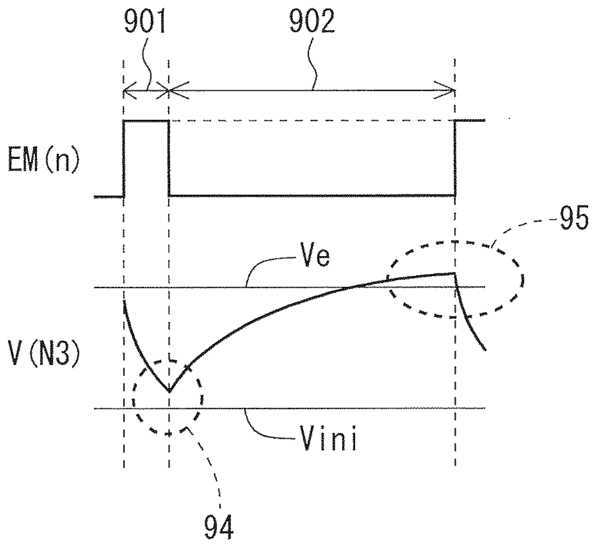
FIG. 19 is a signal waveform diagram for describing how to set the voltage value of the low-level power supply voltage when 120-Hz driving is adopted, regarding the known example.
Figure 20:
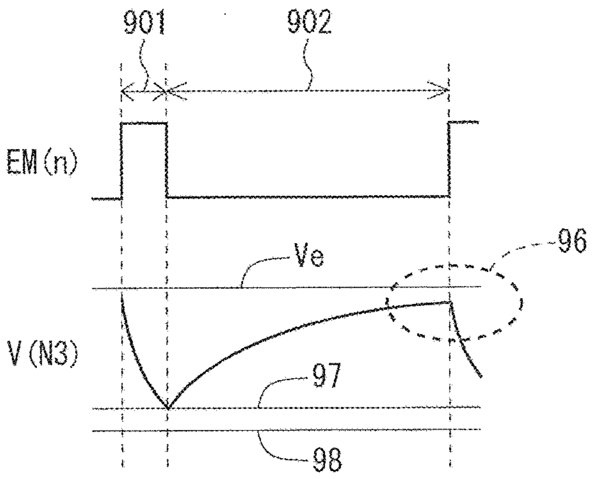
FIG. 20 is a signal waveform diagram for describing how to set the voltage value of the low-level power supply voltage when 120-Hz driving is adopted, regarding the known example.

FIG. 16 is a signal waveform diagram for describing a drive method of the present variant. In the present variant, too, an anode initialization period in the pause driving period is made longer than an anode initialization period in the normal driving period. Then, a data write period TW is made longer by a period corresponding to an extended portion of the anode initialization period than its original length, and a pause period TP is made shorter than its original length. More specifically, when a difference between the anode initialization period in the pause driving period and the anode initialization period in the normal driving period is defined as an "initialization extension period", pause driving is performed such that a data write period TW with a length obtained by adding an initialization extension period ΔT to one frame period in the normal driving period, and a pause period TP including a period with a length obtained by subtracting the initialization extension period ΔT from one frame period in the normal driving period, and a period with a length corresponding to N frame periods (N is an integer) (in FIG. 16, N is two) in the normal driving period appear alternately.

In the present variant, too, the anode initialization period in the pause driving period is longer than that of the known example. As a result, even if the voltage value of the low-level power supply voltage ELVSS used during pause driving is set to a higher value than the voltage value of the low-level power supply voltage ELVSS used during normal driving, in a pixel in which black display is performed, the voltage V(N3) at the third node N3 sufficiently decreases during a turn-off period 82 in the pause driving period. Therefore, even at the end time of a light-emission period 83 in the pause driving period, the voltage V(N3) at the third node N3 is maintained at the light-emission threshold voltage Ve of the organic EL element 21 or less. Thus, black floating does not occur. As such, it becomes possible to reduce power consumption over the known example while preventing occurrence of black floating even when the write frequency of the data voltage is set the same for the normal driving period and the pause driving period.

<7. Others>

Although description is made using an organic EL display device as an example in n the above-described embodiment (including the variants), the configuration is not limited thereto, and the present disclosure can also be applied to inorganic EL display devices, QLED display devices, etc.

In addition, although description is made of an example in which the voltage value of the low-level power supply voltage ELVSS and the voltage value of the initialization voltage Vini are identical in the above-described embodiment (including the variants), the voltage value of the low-level power supply voltage ELVSS and the voltage value of the initialization voltage Vini may differ from each other. Also in this case, provided that the voltage value of the initialization voltage Vini is set such that the voltage V(N3) at the third node N3 does not exceed the light-emission threshold voltage Ve of the organic EL element 21 at the end time of the light-emission period 83 (see FIG. 12) in the pause driving period, by setting the voltage value of the low-level power supply voltage ELVSS used during pause driving to a higher value than the voltage value of the low-level power supply voltage ELVSS used during normal driving, an effect of a reduction in EL power can be obtained as described above.

DESCRIPTION OF REFERENCE CHARACTERS

6: ORGANIC EL DISPLAY PANEL
20: PIXEL CIRCUIT
21: ORGANIC EL ELEMENT
72: LOW-LEVEL POWER SUPPLY VOLTAGE OUTPUT UNIT
200: DISPLAY UNIT
N1 to N3: FIRST TO THIRD NODES
T1: FIRST INITIALIZATION TRANSISTOR
T2: THRESHOLD VOLTAGE COMPENSATION TRANSISTOR
T3: WRITE CONTROL TRANSISTOR
T4: DRIVE TRANSISTOR
T5: POWER SUPPLY CONTROL TRANSISTOR
T6: LIGHT-EMISSION CONTROL TRANSISTOR
T7: SECOND INITIALIZATION TRANSISTOR
ELVDD: HIGH-LEVEL POWER SUPPLY VOLTAGE

ELVSS: LOW-LEVEL POWER SUPPLY VOLTAGE
Vini: INITIALIZATION VOLTAGE
TP: PAUSE PERIOD
TW: DATA WRITE PERIOD
RF: REFRESH FRAME
PF: PAUSE FRAME

The invention claimed is:

1. A display device including a plurality of pixel circuits to which a high-level power supply voltage and a low-level power supply voltage are provided, the plurality of pixel circuits each including a display element that is driven by a current, the display device comprising:
- a plurality of data signal lines each transmitting a data voltage;
- a plurality of scanning signal lines that intersect the plurality of data signal lines;
- a plurality of light-emission control lines that intersect the plurality of data signal lines;
- a pixel driving unit configured to drive the plurality of data signal lines, the plurality of scanning signal lines, and the plurality of light-emission control lines; and
- a low-level power supply voltage output unit configured to output the low-level power supply voltage, wherein
- each of the plurality of pixel circuits includes:
  - the display element having a first terminal and a second terminal to which the low-level power supply voltage is provided;
  - a drive transistor having a control terminal, a first conductive terminal, and a second conductive terminal and provided in series with the display element;
  - a capacitor having one terminal connected to the control terminal of the drive transistor,
  - a light-emission control transistor having a control terminal connected to one of the plurality of light-emission control lines; a first conductive terminal connected to the second conductive terminal of the drive transistor; and a second conductive terminal connected to the first terminal of the display element;
  - a first initialization transistor having a control terminal connected to one of the plurality of scanning signal lines; a first conductive terminal connected to the control terminal of the drive transistor; and a second conductive terminal to which an initialization voltage is provided; and
  - a second initialization transistor having a control terminal connected to one of the plurality of scanning signal lines; a first conductive terminal connected to the first terminal of the display element; and a second conductive terminal to which the initialization voltage is provided,
- the pixel driving unit
  - drives, during a normal driving period, the plurality of data signal lines, the plurality of scanning signal lines, and the plurality of light-emission control lines such that the data voltage is written to the capacitor included in each of the plurality of pixel circuits every frame period, and
  - drives, during a pause driving period, the plurality of data signal lines, the plurality of scanning signal lines, and the plurality of light-emission control lines such that a data write period during which the data voltage is written to the capacitor included in each of the plurality of pixel circuits and a pause period during which the data voltage is not written to the capacitor included in each of the plurality of pixel circuits appear alternately,
- during the pause driving period, the low-level power supply voltage output unit outputs the low-level power supply voltage having a higher voltage value than a voltage value in the normal driving period,
- upon writing the data voltage to the capacitor included in each of the plurality of pixel circuits, a first terminal initialization period during which the second initialization transistor is maintained in on state to initialize a voltage at the first terminal of the display element is provided, and
- the first terminal initialization period in the pause driving period is longer than the first terminal initialization period in the normal driving period.

2. The display device according to claim 1, wherein
- each of the plurality of pixel circuits further includes:
  - a write control transistor having a control terminal connected to one of the plurality of scanning signal lines; a first conductive terminal connected to one of the plurality of data signal lines; and a second conductive terminal connected to the first conductive terminal of the drive transistor;
  - a threshold voltage compensation transistor having a control terminal connected to one of the plurality of scanning signal lines; a first conductive terminal connected to the second conductive terminal of the drive transistor; and a second conductive terminal connected to the control terminal of the drive transistor; and
  - a power supply control transistor having a control terminal connected to one of the plurality of light-emission control lines; a first conductive terminal to which the high-level power supply voltage is provided; and a second conductive terminal connected to the first conductive terminal of the drive transistor.

3. The display device according to claim 2, wherein
- the first initialization transistor, the second initialization transistor, and the threshold voltage compensation transistor are thin-film transistors having a channel layer made of an oxide semiconductor,
  - the drive transistor, the light-emission control transistor, the write control transistor, and the power supply control transistor are thin-film transistors having a channel layer made of low temperature polysilicon,
- the plurality of scanning signal lines include a plurality of first scanning signal lines and a plurality of second scanning signal lines,
- the control terminal of the threshold voltage compensation transistor is connected to one of the plurality of first scanning signal lines,
- the control terminal of the write control transistor is connected to one of the plurality of second scanning signal lines,
- the control terminal of the first initialization transistor is connected to one of the plurality of first scanning signal lines, and
- the control terminal of the second initialization transistor is connected to one of the plurality of first scanning signal lines.

4. The display device according to claim 1, wherein
- a voltage value of the initialization voltage and a voltage value of the low-level power supply voltage are set to equal values, and
- the low-level power supply voltage outputted from the low-level power supply voltage output unit is provided as the initialization voltage to the second conductive terminals of the second initialization transistor.

5. A driving method for a display device including a plurality of data signal lines each transmitting a data voltage; a plurality of scanning signal lines that intersect the plurality of data signal lines; a plurality of light-emission control lines that intersect the plurality of data signal lines; and a plurality of pixel circuits to which a high-level power supply voltage and a low-level power supply voltage are provided, the plurality of pixel circuits each including a display element that is driven by a current, wherein each of the plurality of pixel circuits includes:

the display element having a first terminal and a second terminal to which the low-level power supply voltage is provided;

a drive transistor having a control terminal, a first conductive terminal, and a second conductive terminal and provided in series with the display element;

a capacitor having one terminal connected to the control terminal of the drive transistor, a light-emission control transistor having a control terminal connected to one of the plurality of light-emission control lines; a first conductive terminal connected to the second conductive terminal of the drive transistor; and a second conductive terminal connected to the first terminal of the display element;

a first initialization transistor having a control terminal connected to one of the plurality of scanning signal lines; a first conductive terminal connected to the control terminal of the drive transistor; and a second conductive terminal to which an initialization voltage is provided; and a second initialization transistor having a control terminal connected to one of the plurality of scanning signal lines; a first conductive terminal connected to the first terminal of the display element; and a second conductive terminal to which the initialization voltage is provided, and the driving method comprises:

a normal driving step of driving the plurality of data signal lines, the plurality of scanning signal lines, and the plurality of light-emission control lines such that the data voltage is written to the capacitor included in each of the plurality of pixel circuits every frame period;

a pause driving step of driving the plurality of data signal lines, the plurality of scanning signal lines, and the plurality of light-emission control lines such that a data write period during which the data voltage is written to the capacitor included in each of the plurality of pixel circuits and a pause period during which the data voltage is not written to the capacitor included in each of the plurality of pixel circuits appear alternately;

a low-level power supply voltage increasing step of increasing a voltage value of the low-level power supply voltage upon switching from a normal driving period during which the normal driving step is performed to a pause driving period during which the pause driving step is performed; and a low-level power supply voltage reducing step of reducing the voltage value of the low-level power supply voltage upon switching from the pause driving period to the normal driving period, upon writing the data voltage to the capacitor included in each of the plurality of pixel circuits, a first terminal initialization period during which the second initialization transistor is maintained in on state to initialize a voltage at the first terminal of the display element is provided, and the first terminal initialization period in the pause driving period is longer than the first terminal initialization period in the normal driving period.

6. The driving method according to claim 5, wherein a write frequency used upon writing the data voltage to the capacitor included in each of the plurality of pixel circuits during the pause driving period is lower than a write frequency used upon writing the data voltage to the capacitor included in each of the plurality of pixel circuits during the normal driving period.

7. The driving method according to claim 6, wherein a length of the data write period in the pause driving period is twice a length of the data write period in the normal driving period.

8. The driving method according to claim 1, wherein a write frequency used upon writing the data voltage to the capacitor included in each of the plurality of pixel circuits during the normal driving period is identical to a write frequency used upon writing the data voltage to the capacitor included in each of the plurality of pixel circuits during the pause driving period, and in the pause driving step, a data write period with a length obtained by adding an initialization extension period to one frame period in the normal driving period, and a pause period including a period with a length obtained by subtracting the initialization extension period from one frame period in the normal driving period, and a period with a length corresponding to N frame periods in the normal driving period appear alternately, the initialization extension period being a difference between the first terminal initialization period in the pause driving period and the first terminal initialization period in the normal driving period, and the N being an integer.

9. The driving method according to claim 5, wherein a voltage value of the initialization voltage and a voltage value of the low-level power supply voltage are set to equal values.

10. The driving method according to claim 5, wherein the display device includes a pixel driving unit configured to drive the plurality of data signal lines, the plurality of scanning signal lines, and the plurality of light-emission control lines, a voltage value of the data voltage corresponding to black is set to a higher value than a voltage value of the data voltage corresponding to white, and is set to a lower value in the pause driving period than in the normal driving period, as power supply voltages for operation of the pixel driving unit, a first power supply voltage of a high level and a second power supply voltage of a low level are provided to the pixel driving unit, and a voltage value of the first power supply voltage is set to a lower value in the pause driving period than in the normal driving period.

11. The driving method according to claim 5, wherein the first terminal initialization period is a part of a turn-off period during which the light-emission control transistor is maintained in off state.

* * * * *